US009720559B2

(12) United States Patent
Tan et al.

(10) Patent No.: US 9,720,559 B2
(45) Date of Patent: Aug. 1, 2017

(54) COMMAND AUTHENTICATION

(71) Applicant: Microsoft Corporation, Redmond, WA (US)

(72) Inventors: Desney S. Tan, Kirkland, WA (US); Kenneth P. Hinckley, Redmond, WA (US); Steven N. Bathiche, Kirkland, WA (US); Ronald O. Pessner, Seattle, WA (US); Bongshin Lee, Issaquah, WA (US); Anoop Gupta, Woodinville, WA (US); Amir Netz, Bellevue, WA (US); Brett D. Brewer, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 14/175,984

(22) Filed: Feb. 7, 2014

(65) Prior Publication Data
US 2015/0106739 A1 Apr. 16, 2015

Related U.S. Application Data

(60) Provisional application No. 61/890,755, filed on Oct. 14, 2013, provisional application No. 61/890,778, filed on Oct. 14, 2013.

(51) Int. Cl.
G06F 3/00 (2006.01)
G06F 3/0481 (2013.01)
(Continued)

(52) U.S. Cl.
CPC .......... G06F 3/0481 (2013.01); G06F 3/0484 (2013.01); G06F 3/04883 (2013.01);
(Continued)

(58) Field of Classification Search
CPC ...... G06F 3/0425; G06F 3/017; G06F 3/0488; G06F 3/011; G06F 3/0317; G06F 3/0354;
(Continued)

(56) References Cited

U.S. PATENT DOCUMENTS 8,473,851 B2 * 6/2013 DeGrazia .............. G06F 3/0481
715/753
8,693,990 B2 4/2014 Facemire et al.
(Continued)

FOREIGN PATENT DOCUMENTS

EP 2587342 A1 5/2013
WO 2012116464 A1 9/2012

OTHER PUBLICATIONS

"PCT Demand under Article 31," From PCT Patent Application No. PCT/US2014/059988, Mailed Apr. 2, 2015, 20 pages.
(Continued)

Primary Examiner — Di Xiao
(74) Attorney, Agent, or Firm — Rainier Patents, P.S.

(57) ABSTRACT

The description relates to a shared digital workspace. One example includes a display device and sensors. The sensors are configured to detect users proximate the display device and to detect that an individual user is performing an individual user command relative to the display device. The system also includes a graphical user interface configured to be presented on the display device that allows multiple detected users to simultaneously interact with the graphical user interface via user commands.

20 Claims, 15 Drawing Sheets

(51) Int. Cl.
*H04L 29/06* (2006.01)
*G06F 3/0484* (2013.01)
*G06F 21/31* (2013.01)
*G06F 21/32* (2013.01)
*G06F 21/34* (2013.01)
*G06F 3/0488* (2013.01)
*G06F 21/84* (2013.01)

(52) U.S. Cl.
CPC .......... *G06F 3/04886* (2013.01); *G06F 21/31* (2013.01); *G06F 21/316* (2013.01); *G06F 21/32* (2013.01); *G06F 21/34* (2013.01); *G06F 21/84* (2013.01); *H04L 65/40* (2013.01); *G06F 2203/04808* (2013.01); *G06F 2221/032* (2013.01); *G06F 2221/2149* (2013.01)

(58) Field of Classification Search
CPC .... G06F 3/048; G06F 3/0482; G06F 3/04886; G06F 2203/0384; G06F 2203/04806
See application file for complete search history.

(56) References Cited

U.S. PATENT DOCUMENTS

| | | | |
|---|---|---|---|
| 8,743,021 | B1 | 6/2014 | Park et al. |
| 8,866,771 | B2 | 10/2014 | Hintermeister |
| 2002/0005915 | A1 | 1/2002 | Rodriguez |
| 2004/0196433 | A1 | 10/2004 | Durnell |
| 2005/0120003 | A1 | 6/2005 | Drury et al. |
| 2005/0288932 | A1 | 12/2005 | Kurzweil et al. |
| 2006/0294388 | A1* | 12/2006 | Abraham ............... G06F 21/305 713/182 |
| 2007/0106942 | A1 | 5/2007 | Sanaka et al. |
| 2007/0124370 | A1* | 5/2007 | Nareddy ............... G06Q 10/10 709/204 |
| 2007/0226636 | A1* | 9/2007 | Carpenter .............. G06F 3/048 715/751 |
| 2008/0316301 | A1 | 12/2008 | Givon |
| 2009/0076894 | A1 | 3/2009 | Bates et al. |
| 2009/0150816 | A1 | 6/2009 | Lyle et al. |
| 2010/0169091 | A1 | 7/2010 | Zurek et al. |
| 2010/0205190 | A1 | 8/2010 | Morris et al. |
| 2010/0269072 | A1* | 10/2010 | Sakata .................. G06F 1/1601 715/863 |
| 2010/0293501 | A1 | 11/2010 | Russ et al. |
| 2011/0197263 | A1 | 8/2011 | Stinson |
| 2012/0001923 | A1 | 1/2012 | Weinzimmer |
| 2012/0021806 | A1 | 1/2012 | Maltz |
| 2012/0060214 | A1 | 3/2012 | Nahari |
| 2012/0092328 | A1 | 4/2012 | Flaks et al. |
| 2012/0151012 | A1* | 6/2012 | Mustafa ................ H04L 65/80 709/219 |
| 2012/0229909 | A1 | 9/2012 | Clavin et al. |
| 2012/0274598 | A1 | 11/2012 | Uy |
| 2012/0290401 | A1 | 11/2012 | Neven |
| 2012/0319972 | A1* | 12/2012 | Tse ...................... G06F 1/3262 345/173 |
| 2013/0027180 | A1 | 1/2013 | Lakamraju et al. |
| 2013/0038548 | A1 | 2/2013 | Kitada et al. |
| 2013/0044128 | A1 | 2/2013 | Liu et al. |
| 2013/0054576 | A1 | 2/2013 | Karmarkar et al. |
| 2013/0073980 | A1* | 3/2013 | Amendolagine ..... G06F 3/0481 715/751 |
| 2013/0147838 | A1 | 6/2013 | Small et al. |
| 2013/0160141 | A1* | 6/2013 | Tseng ................. G06F 21/6245 726/28 |
| 2013/0185804 | A1* | 7/2013 | Biswas ................ G06F 21/577 726/26 |
| 2013/0209082 | A1 | 8/2013 | Cameron et al. |
| 2013/0226845 | A1 | 8/2013 | Gobert |
| 2013/0283213 | A1* | 10/2013 | Guendelman .......... G06F 3/017 715/848 |
| 2013/0290475 | A1* | 10/2013 | Flagg ................... H04L 67/18 709/217 |
| 2013/0347072 | A1* | 12/2013 | Dinha ................ H04L 63/0272 726/4 |
| 2014/0143149 | A1* | 5/2014 | Aissi .................... G06F 21/31 705/44 |
| 2014/0215504 | A1 | 7/2014 | Hsiao et al. |
| 2014/0231526 | A1* | 8/2014 | Ishigami ............ G06F 3/03545 235/470 |
| 2014/0297528 | A1* | 10/2014 | Agrawal ................ G06F 21/32 705/44 |
| 2014/0310256 | A1 | 10/2014 | Olsson |
| 2015/0102891 | A1 | 4/2015 | Yoon et al. |
| 2015/0102981 | A1 | 4/2015 | Lee et al. |
| 2015/0106386 | A1 | 4/2015 | Lee et al. |
| 2015/0106740 | A1 | 4/2015 | Tan et al. |
| 2016/0283778 | A1 | 9/2016 | Karakotsios et al. |

OTHER PUBLICATIONS

"International Search Report and Written Opinion," From PCT Patent Application No. PCT/US2014/059989, Mailed Date: Feb. 24, 2015, 14 pages.

Sahoo et al., "Multimodal Biometric Person Authentication: A Review," IETE Technical Review, vol. 29, No. 1, Jan. 31, 2012, pp. 54-75.

Second Written Opinion mailed Aug. 31, 2015 from PCT Patent Application No. PCT/US2014/059988, 5 pages.

"International Search Report & Written Opinion," from PCT Patent Application No. PCT/US2014/059988, Mailed Date: Dec. 23, 2014, 12 pages.

Non-Final Office Action mailed Dec. 9, 2015 from U.S. Appl. No. 14/175,991, 34 pages.

Final Office Action mailed Sep. 1, 2016 from U.S. Appl. No. 14/177,102, 36 pages.

International Preliminary Report on Patentability mailed Jan. 25, 2016 from PCT Patent Application No. PCT/US2014/059988, 6 pages.

U.S. Appl. No. 61/890,027 titled "Eye Tracking," filed Oct. 11, 2013 by inventors Lee, et al., 31 pages.

Non-Final Office Action mailed Apr. 7, 2015 from U.S. Appl. No. 14/177,102, 17 pages.

Response filed Jun. 30, 2015 to the Non-Final Office Action mailed Apr. 7, 2015 from U.S. Appl. No. 14/177,102, 12 pages.

Final Office Action mailed Aug. 7, 2015 from U.S. Appl. No. 14/177,102, 20 pages.

Response filed Dec. 9, 2015 to the Final Office Action mailed Aug. 7, 2015 from U.S. Appl. No. 14/177,102, 11 pages.

Non-Final Office Action mailed Mar. 18, 2016 from U.S. Appl. No. 14/177,102, 32 pages.

International Search Report and Written Opinion mailed Jan. 20, 2015 from PCT Patent Application No. PCT/US2014/059583, 13 pages.

Response and Demand under Article 31 filed May 1, 2015 from PCT Patent Application No. PCT/US2014/059583, 19 pages.

Second Written Opinion mailed Aug. 31, 2015 from PCT Patent Application No. PCT/US2014/059583, 7 pages.

International Preliminary Report on Patentability mailed Dec. 22, 2015 from PCT Patent Application No. PCT/US2014/059583, 16 pages.

Non-Final Office Action mailed Sep. 24, 2015 from U.S. Appl. No. 14/177,079, 16 pages.

Response filed Dec. 31, 2015 to the Non-Final Office Action mailed Sep. 24, 2015 from U.S. Appl. No. 14/177,079, 12 pages.

Non-Final Office Action mailed Jun. 1, 2016 from U.S. Appl. No. 14/177,079, 22 pages.

International Search Report and Written Opinion mailed Feb. 19, 2015 from PCT Patent Application No. PCT/US2014/059585, 14 pages.

International Preliminary Report on Patentability mailed Apr. 12, 2016 from PCT Patent Application No. PCT/US2014/059585, 11 pages.

Final Office Action mailed Jul. 19, 2016 from U.S. Appl. No. 14/175,991, 59 pages.

(56) References Cited

OTHER PUBLICATIONS

Response filed Jul. 5, 2016 to the Non-Final Office Action mailed Mar. 18, 2016 from U.S. Appl. No. 14/177,102, 11 pages.
Communication pursuant to Rules 161(1) and 162 EPC mailed May 23, 2016 from European Patent Application No. 14819112.5, 2 pages.
Response filed Jul. 12, 2016 to the Communication pursuant to Rules 161(1) and 162 EPC mailed May 23, 2016 from European Patent Application No. 14819112.5, 17 pages.
Communication Pursuant to Rules 161(1) and 162 EPC mailed May 23, 2016 from European Patent Application No. 14787367.3, 2 pages.
Response filed Jul. 4, 2016 to the Communication Pursuant to Rules 161(1) and 162 EPC mailed May 23, 2016 from European Patent Application No. 14787367.3, 12 pages.
Response filed Aug. 23, 2016 to the Non-Final Office Action mailed Jun. 1, 2016 from U.S. Appl. No. 14/177,079, 11 pages.
International Preliminary Report on Patentability mailed Apr. 28, 2016 from PCT Patent Application No. PCT/US2014/059989, 10 pages.
U.S. Appl. No. 61/890,778 titled "Shared Digital Space," filed Oct. 14, 2013 by inventors Pessner et al., 38 pages.
U.S. Appl. No. 61/890,755 titled "Command Authentication," filed Oct. 14, 2013 by inventors Tan et al., 39 pages.
Response filed Mar. 16, 2016 to the Non-Final Office Action mailed Dec. 9, 2016 from U.S. Appl. No. 14/175,991, 12 pages.
Notice of Allowance mailed Mar. 10, 2017 from U.S. Appl. No. 14/175,991, 33 pages.
Response filed Mar. 24, 2017 to the Non-Final Office Action mailed Dec. 22, 2016 from U.S. Appl. No. 14/177,102, 14 pages.
Corrected Notice of Allowability and Examiner-Initiated Interview Summary mailed Apr. 4, 2017 from U.S. Appl. No. 14/175,991, 14 pages.
Response filed Oct. 4, 2016 to the Final Office Action mailed Jul. 19, 2016 from U.S. Appl. No. 14/175,991, 13 pages.
Response filed Oct. 6, 2016 to the Final Office Action mailed Sep. 1, 2016 from U.S. Appl. No. 14/177,102, 13 pages.
Communication pursuant to Rules 161(1) and 162 EPC mailed Jun. 1, 2016 from European Patent Application No. 14790908.9, 2 pages.
Response filed Nov. 9, 2016 to the Communication pursuant to Rules 161(1) and 162 EPC mailed Jun. 1, 2016 from European Patent Application No. 14790908.9, 17 pages.
Response filed Jan. 25, 2017 to the Non-Final Office Action mailed Dec. 9, 2016 from U.S. Appl. No. 14/177,079, 13 pages.
Non-Final Office Action mailed Dec. 22, 2016 from U.S. Appl. No. 14/177,102, 24 pages.
Non-Final Office Action mailed Dec. 9, 2016 from U.S. Appl. No. 14/177,079, 40 pages.
Corrected Notice of Allowability mailed Apr. 20, 2017 from U.S. Appl. No. 14/175,991, 13 pages.
Corrected Notice of Allowability mailed May 16, 2017 from U.S. Appl. No. 14/175,991, 22 pages.
Non-Final Office Action mailed May 17, 2017 from U.S. Appl. No. 14/177,079, 6 pages.
Final Office Action mailed May 25, 2017 from U.S. Appl. No. 14/177,102, 29 pages.

* cited by examiner

COMMAND AUTHENTICATION

BACKGROUND

Traditionally, computing devices have been configured to be operated by a single user at a time. The computing devices generated a graphical user interface directed at the individual user. If a second user wanted to use the computing device, the first user logged out and the second user logged in. Responsively, the computing device would generate a second graphical user interface directed to the second user. Thus, the computing device is configured for sequential use rather than simultaneous use by the users.

SUMMARY

The description relates to a shared digital workspace. One example includes a display device and sensors. The sensors are configured to detect users proximate the display device and to detect that an individual user is performing an individual user command (e.g., input command) relative to the display device. The system also includes a graphical user interface configured to be presented on the display device that allows multiple detected users to simultaneously interact with the graphical user interface via user commands.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

OVERVIEW

Figure 1:
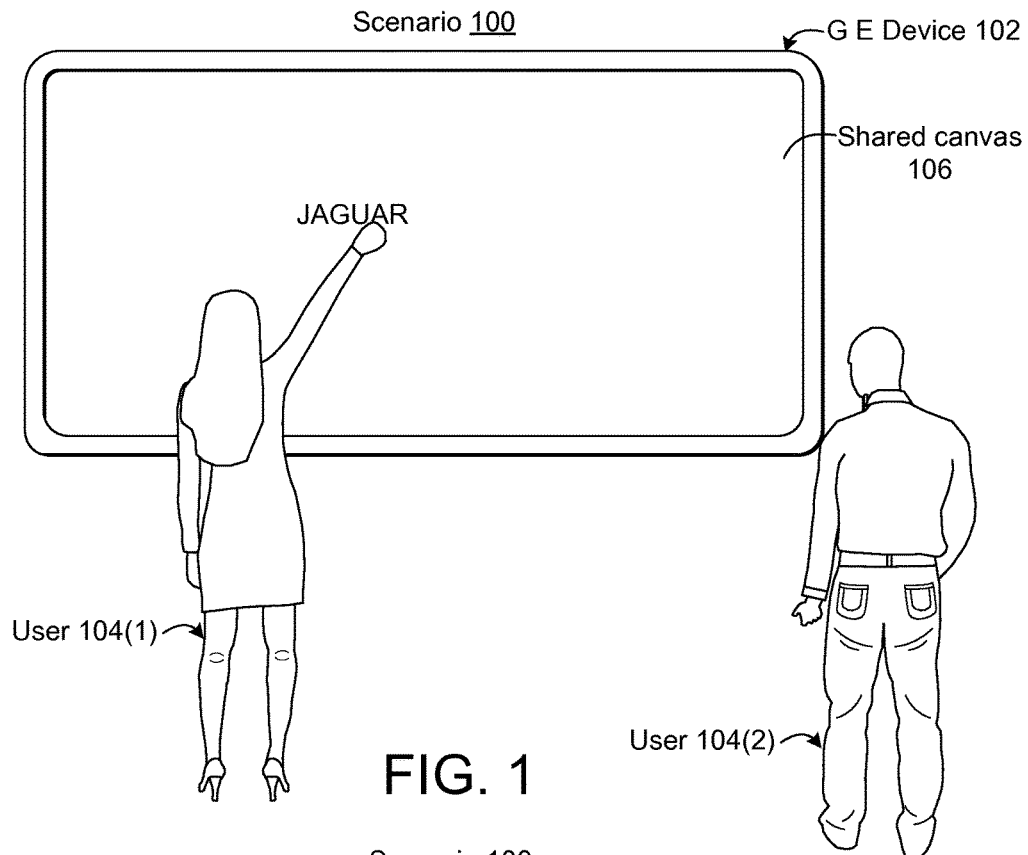
FIGS. 1-16 show example shared digital workspace scenarios in accordance with some implementations of the present concepts.

The description relates to a shared digital workspace or "shared canvas", which may be provided by a digital whiteboard, among other devices. As such, these devices can be thought of as group experience devices. The shared canvas can allow multiple simultaneous users (e.g., a group of users). Any device can potentially function as a group experience device, but the concepts are more readily applied to devices that have large enough displays to be readily physically engaged by several users simultaneously.

"Group" for the purpose of this discussion is a collection of individuals (at least some of whom) are physically co-located in the same space and are interacting with each other. One group example can consist of a couple of employees meeting together to discuss or debate a topic. A family interacting in their kitchen can be another such group. A few friends getting together to plan an activity can be yet another group.

The present concepts can provide a group experience. The group experience can be centered around a single shared device (e.g., group experience device) that all of the group members can comfortably interact and control. In the group experience, no single user is dominating the group experience device. The ability of each member of the group to initiate an interaction can be immediate and frictionless. The group experience device is often the focal point for the discussion among the group members and while one user interacts, the others can watch and can immediately step in and intervene if they feel like. Thus, two or more users can interact with the shared canvas simultaneously.

In some of the proposed implementations, group experience devices can become a category of their own—as a peer to desktops and tablets. Differentiated from their peers, group experience devices can be optimized for the group experience instead of the single user. The group experience devices can employ different, yet familiar, form factors from single user devices. The form factors can include innovative interaction models and input technologies. Input technologies such as, touch, pen, gesture, speech and/or vision can be leveraged in the group experience devices. In some cases, a device may be configured to operate in either an individual-centric mode or a group mode, as desired.

The applicability of the group experience devices is broad—virtually any space where people likely meet and interact. Meeting rooms, offices, home kitchens, family rooms, and even hallways are all great locations to place them.

The group experience devices can leverage the natural way humans interact with each other in a group settings. For instance, the group experience devices can support and enable our natural stance, the typical dynamics between members of the group, and the type of activities that a group is likely to engage in together.

Some of the present implementations can emphasize anonymous usage over authentication. These implementations can strongly push a highly common experience and common organization at the expense of personalization and personality. Such a configuration can be attractive to users for their low barrier to use; just walk up and start using the group experience device. However, these same users may yearn for the ability to integrate their personal data into a group experience. Some of the present implementations can address both of these considerations.

Toward this end, some implementations can offer two layers of functionality. The first layer can be thought of as a basic functionality. Any user can engage the group experience device and immediately utilize the basic functionality. The second layer can be a conditional or advanced functionality. For instance, the second functionality can be available only to users who have been identified (e.g., authenticated) by the group experience device. These aspects are explained below by way of example.

SCENARIO EXAMPLES

FIGS. 1-15 collectively show a group experience scenario 100 where a group experience device 102 is positioned in a conference room. In this example, two users 104(1) and 104(2) walk into the conference room. As the users are detected, the group experience device 102 can power up to a ready state and present a shared display area or shared canvas 106. In this example, the first user 104(1) immediately walks up and starts writing on the shared canvas 106. In this example the user writes the word "jaguar". Writing on the shared canvas 106 can be enabled as an example of a basic functionality that is made available to all users.

Other examples of basic functionality can include images, video, text boxes, shape recorded smart objects from ink, lists, tables, timelines, shape art (circle, square, triangle, etc.), sticky notes, and/or charts, among others. Still further examples of basic functionality can include a brainstorming application, a research and exploration tool, time/calendar coordination, activity planner, product/shopping comparison tool, data exploration tool, budgeting and allocations, among others. Further, in some implementations the basic functionality of the shared canvas can be limited to the visible canvas. In other configurations, the basic functionality can include a scrollable canvas in the horizontal and/or vertical directions (e.g., the available canvas can be greater than what can be displayed at a given instance).

Further, in this case, assume that each of the users is identified. Techniques and mechanisms for user identification are described below relative to FIGS. 17-18. Assume that the first user 104(1) has a picture of a jaguar in her personal data that she wants to show on the shared canvas 106. The personal data may be stored in the cloud, such as in a global account and/or on one of her personal devices, such as a smart phone, tablet, or other computer. Access to personal data is an example of the conditional functionality.

As an identified user, the first user 104(1) can access her personal data through the shared canvas 106. Some implementations can allow the user to have a personal space on the shared canvas. The user can interact with their personal content in their personal space. Briefly, in this implementation the personal space is manifest as a portal or tunnel, which is described below.

In this particular implementation, the first user can make a specific user command gesture, such as a double-tap on the shared canvas to access her personal data. Specifically, the group experience device 102 can identify the user and determine that that specific user has performed a user command to access his/her personal data. The group experience device can utilize the identity of the user to access the user's personal data. Note that the double-tap is only one example for controlling the shared canvas. For instance, other implementations can use other active user commands and/or passive user commands, such as touch gestures, non-touch gestures, eye gaze, voice commands, and/or commands entered via another device, such as smart phone, among others. Still other implementations can automatically open a portal for the identified user rather than awaiting a user command.

Figure 2:
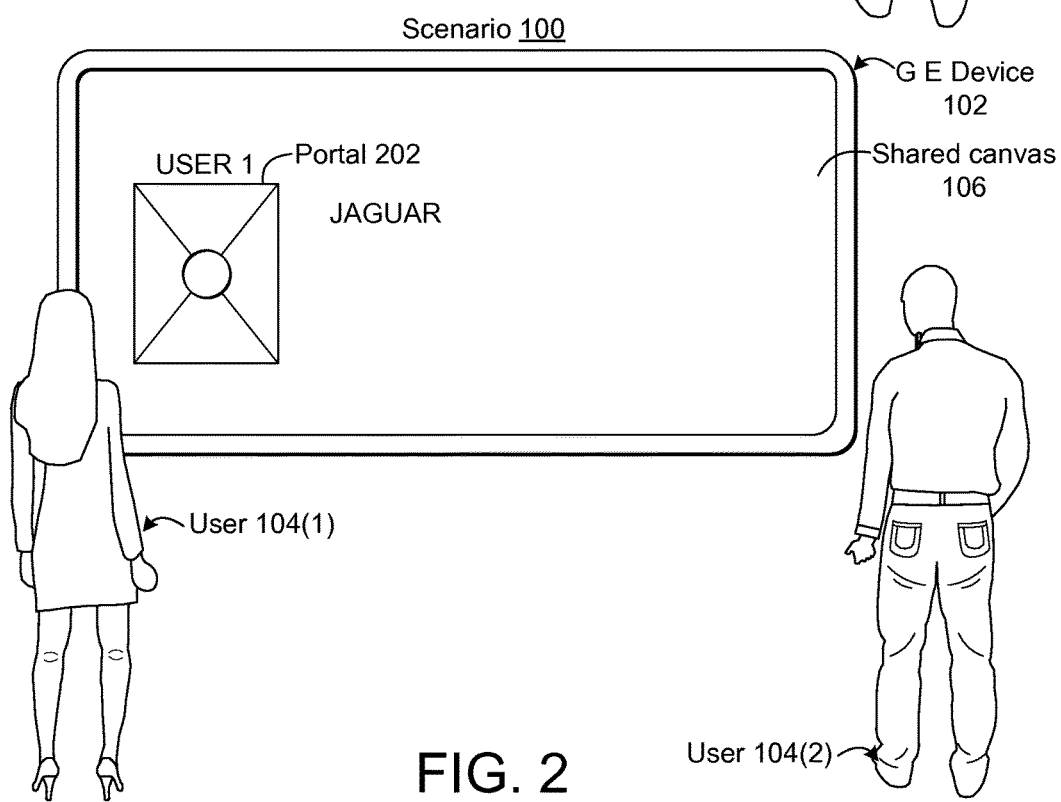

As represented in FIG. 2, in this example, the user double-tap gesture can cause a portal or tunnel 202 to be presented on the shared canvas 106. The portal 202 can represent that user's personal space/data on the shared canvas. The portal can be identified as belonging to the user (e.g., user 1). (Of course, other ways of associating the user and the portal can be employed. For instance, the photograph of the user or an avatar of the user may be displayed proximate to the portal.) The user can perform another user command relative to the portal 202 to view or access his/her personal data. For instance, the user may touch the portal.

Figure 3:
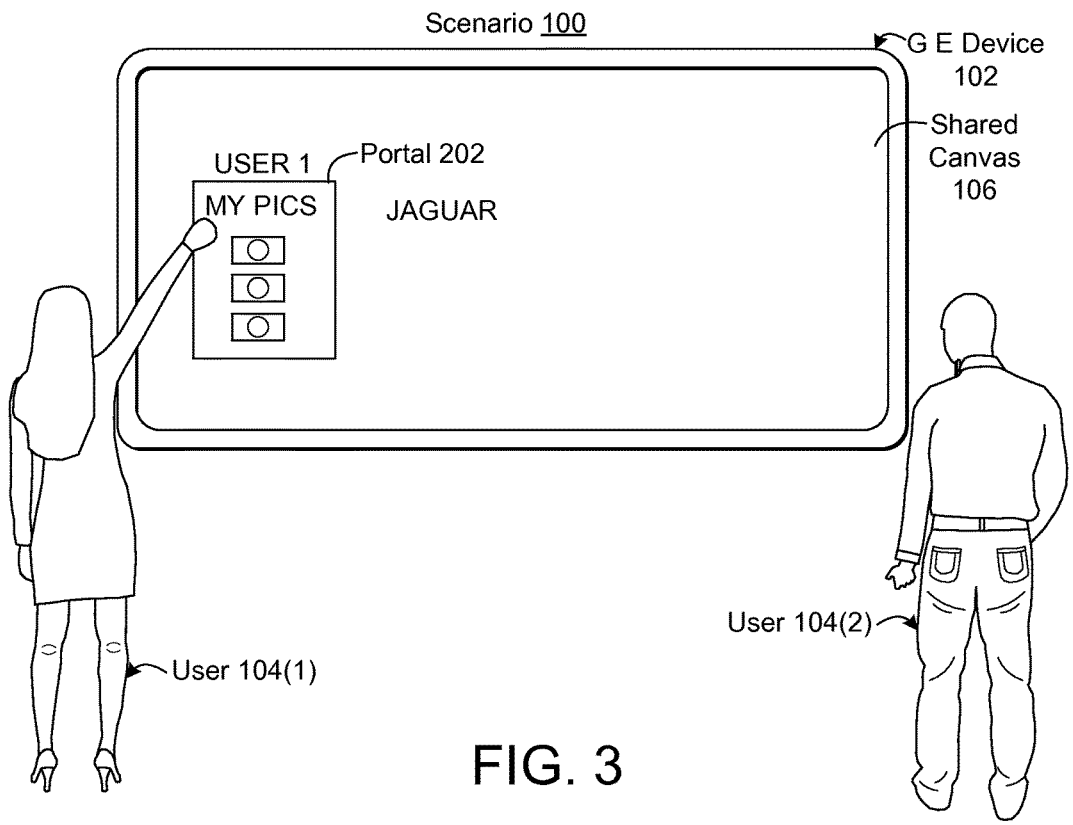

FIG. 3 shows the user's personal data/content inside the portal 202. In this case, the personal data is the user's pictures. (Of course, due to the constraint of the drawing page only a representative example of the user's personal data can be illustrated. For instance, the portal may show the user's global profile (e.g., cloud stored data) and/or data by individual device. Further, the user's personal data may be organized in various ways for the user in the portal. The user may also have the option of searching the personal data in the portal.) Some implementations can allow the user to zoom a portion of the shared canvas. For instance, the user could zoom on her portal so that it temporarily occupied a greater portion or all of the shared canvas to facilitate the user viewing her personal data.

Figure 4:
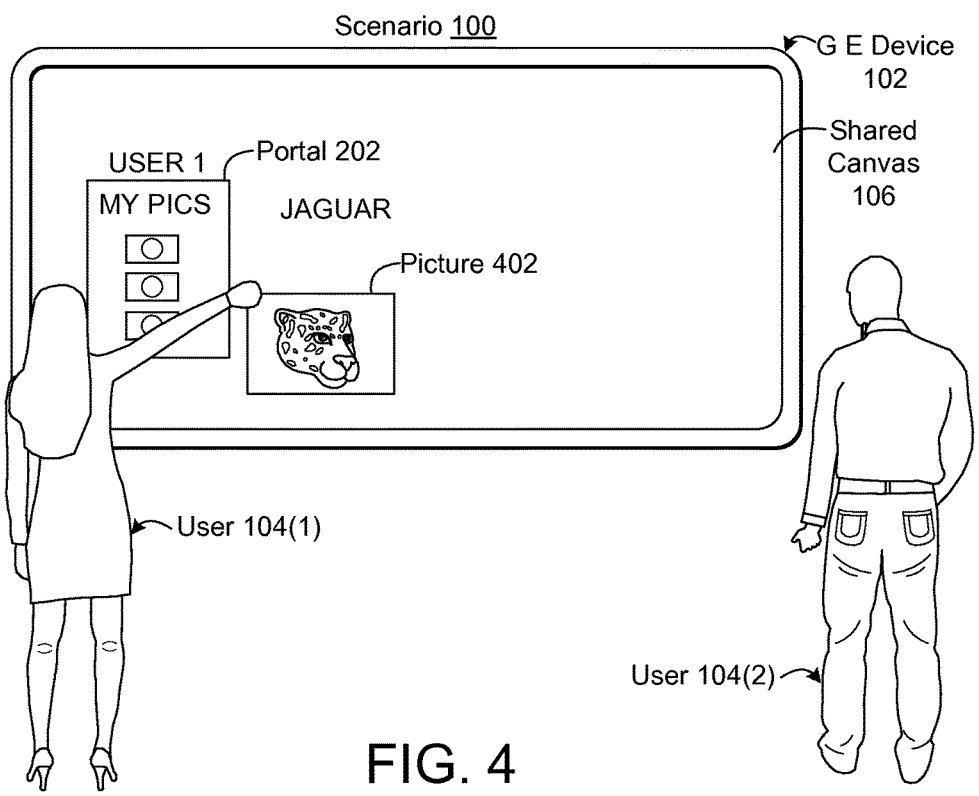

As shown in FIG. 4, the user 104(1) can easily retrieve data from the portal 202 and move a copy to the shared canvas 106. In this case, the user drags a picture of a jaguar 402 from the portal 202 to the shared canvas 106.

The portal 202 can be the individual user's private space on the otherwise shared canvas 106. The portal can be interactive and can accept any input that the user might perform on one of her devices shown in the portal. This allows for bi-directional input between this portal and the personal device (and/or the user's global content). As mentioned above, in some configurations, users can temporarily make any portal 202 at any time take up the full screen real estate of the shared canvas 106. Alternatively or additionally, some implementations can allow the user to define how she wants her portal displayed in terms of size and/or content. For instance, the user may want the portal to employ semantic view techniques where the user can either zoom out of a view to see a summary of the content or zoom in to see content grouped by various parameters, such as category, alphabetic, or chronological parameters, among others.

Figure 5:
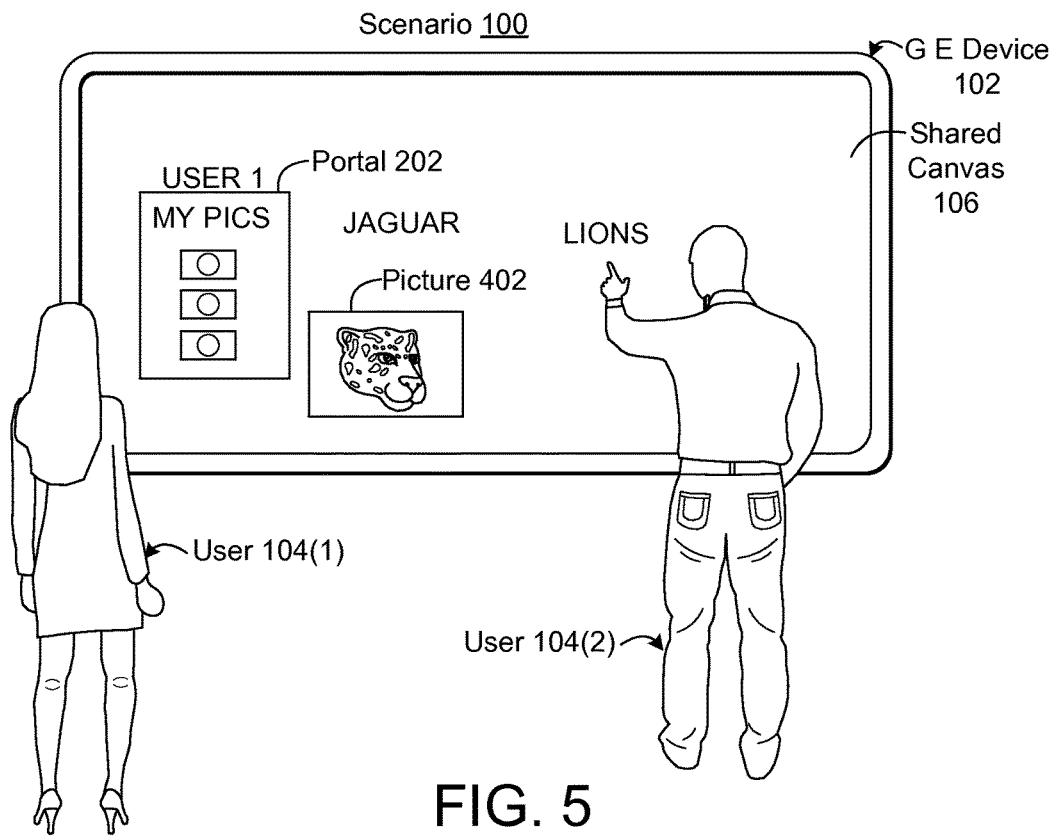
Figure 6:
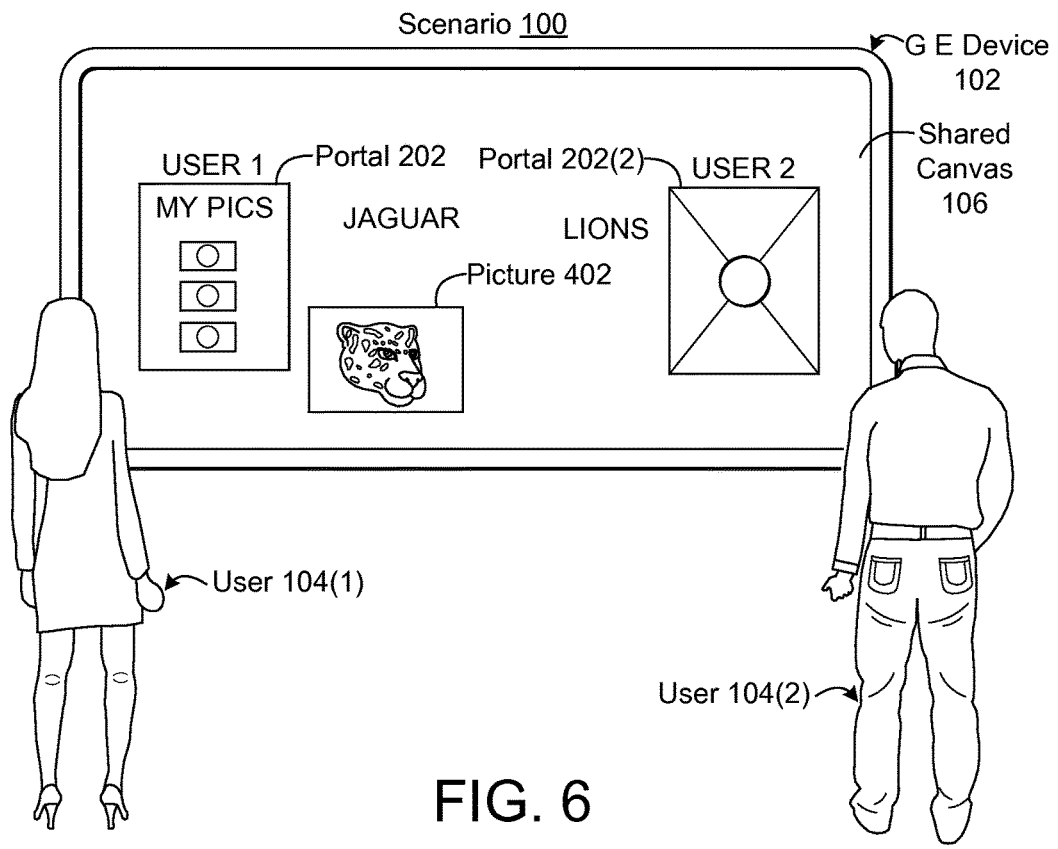

FIG. 5 shows how the second user 104(2) can utilize the basic functionality, such as writing the word "lions". FIG. 6 shows the second user launching his own portal 202(2).

Figure 7:
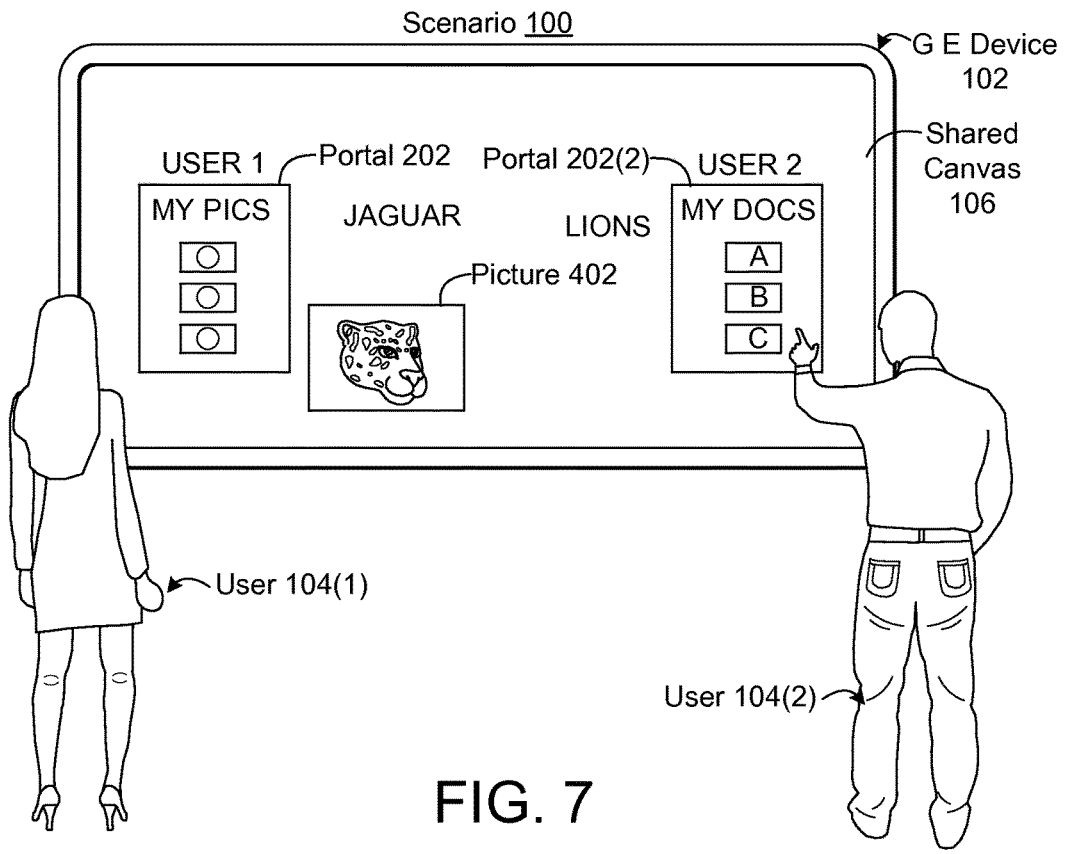
Figure 8:
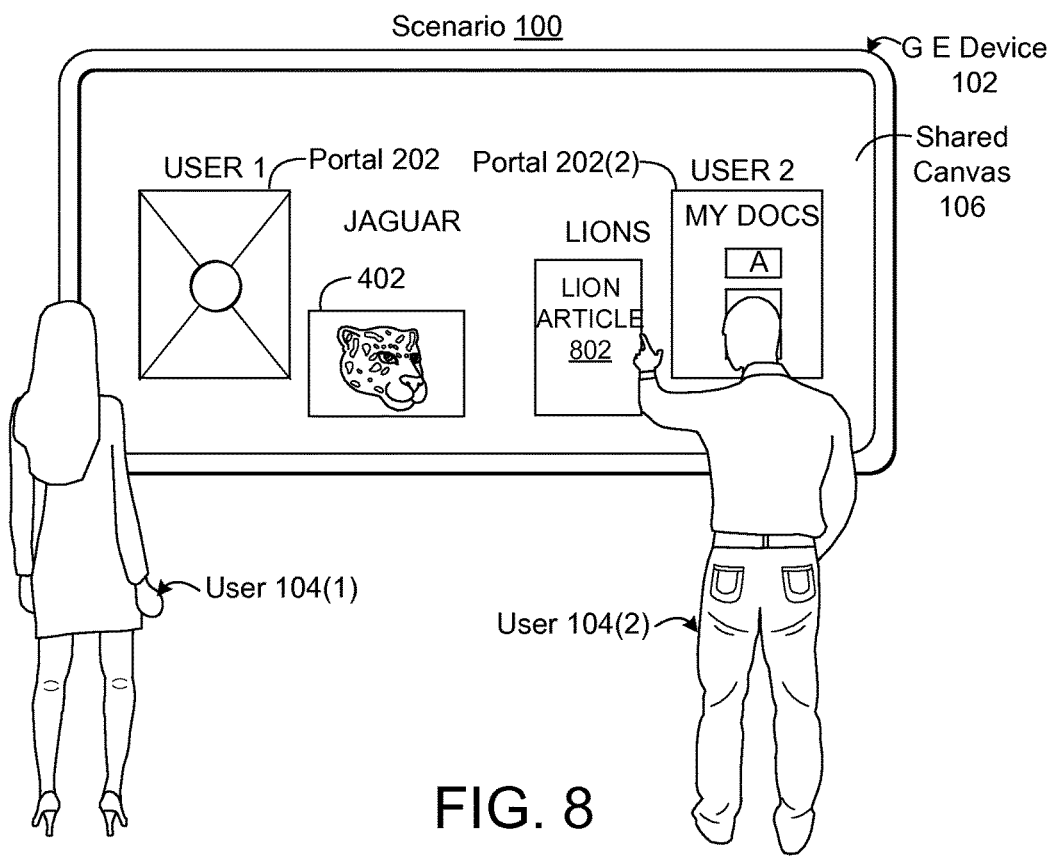

FIGS. 7-8 show the second user 104(2) selecting and moving personal content from his portal 202(2) to the shared canvas 106. In this case, the content is an article about lions indicated at 802.

Note also, that in FIG. 8, the first user's portal 202 has closed to protect the user's privacy. The first user 104(1) can manually perform a gesture (or other user command) to cause the portal 202 to close or the portal can close automatically. For example, the portal can close based upon a period of inactivity or in an instance when the user walks away from the portal, such that it is apparent the user is not intending to engage the portal 202. The portal is still readily available to the user via a simple user command. In another implementation, the first user can be automatically notified when other users (such as the second user) approach the group experience device 102 when the first user has her portal 202 open. Such a configuration can allow the user to take actions to safeguard her personal content if she so desires.

At any point either user 104(1) or 104(2) can make a copy of the shared canvas 106 and store the copy in their personal data (e.g., via their portal).

FIGS. 1-8 introduce shared canvas features relative to the users working independently, either serially or simultaneously. These features can also facilitate collaboration between the users as will be explained below by way of example.

Figure 9:
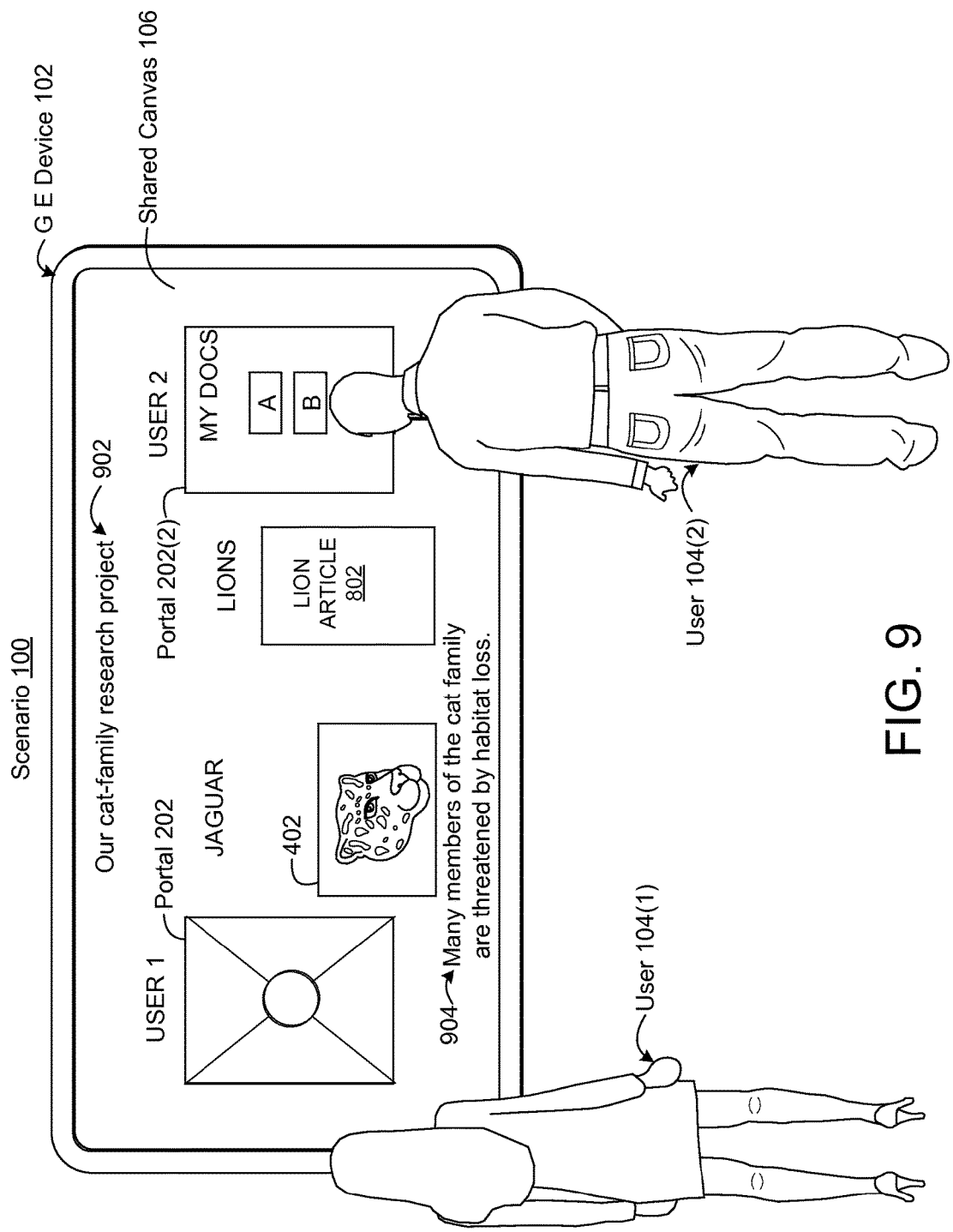

FIG. 9 shows a subsequent scenario where the users 104(1) and 104(2) are using their previously described content in a collaborative effort (e.g., collaborative manner). The second user 104(2) adds a title to the collaborative effort of "Our cat-family research project" at 902 while the first user 104(1) simultaneously adds text that "Many members of the cat family are threatened by habitat loss." at 904. Thus, in this case each user has used their portal to bring their own personal content into the shared space and combined the personal content with content created on the shared space to accomplish the collaborative effort. In this example, some of the work was performed in a concurrent manner while other work was performed in a simultaneous manner (e.g., multiple users working on the shared canvas at the same time).

Figure 10:
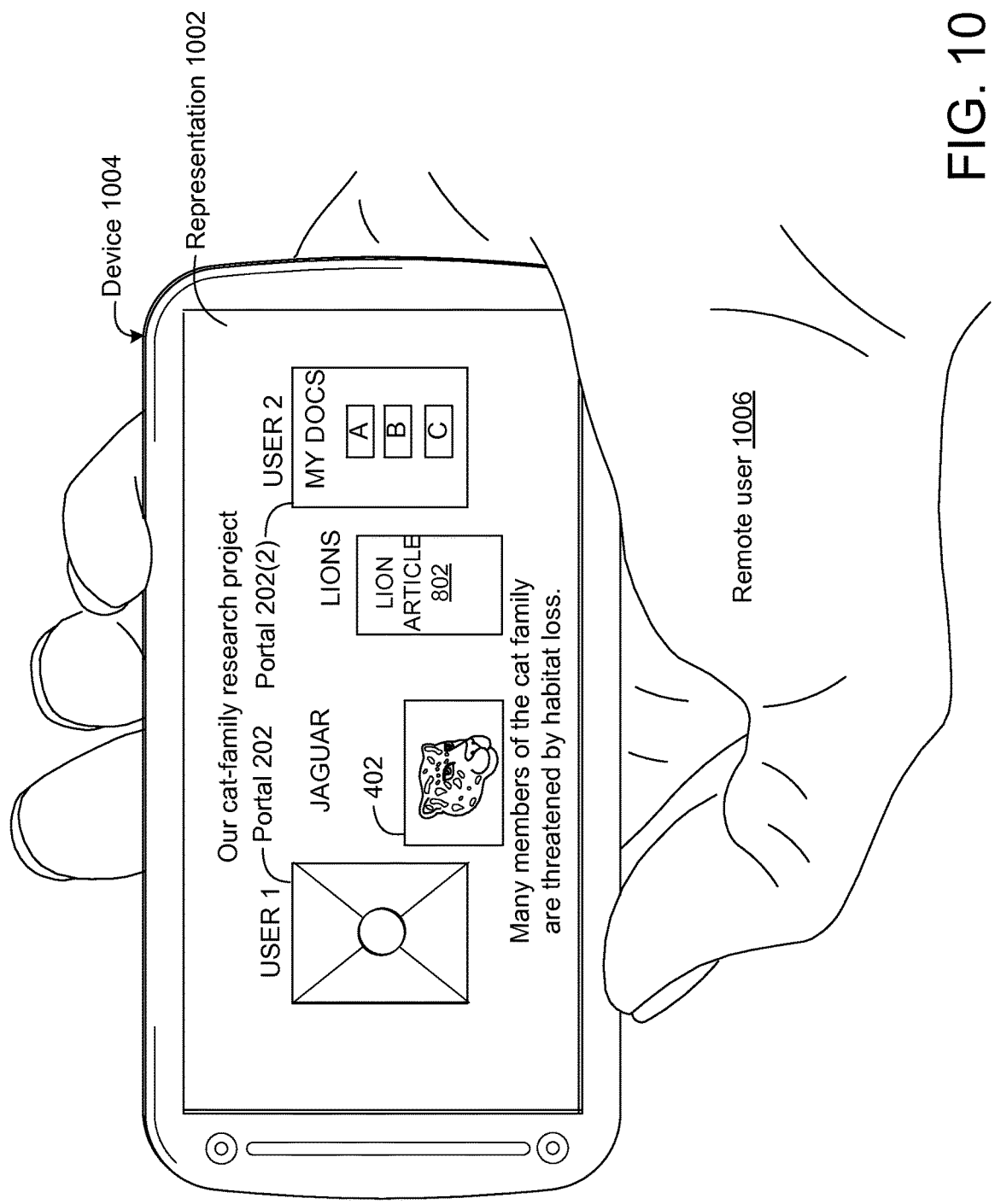

Further, some implementations can allow a remote user to participate in the shared session (e.g., on the shared canvas). For instance, a notice could be presented on the shared canvas 106 that a "third user" wants to participate remotely. Either of the first or second users 104 could indicate that they want to allow the remote user to participate. The remote user could then see a representation of the shared canvas. FIG. 10 shows an example of a representation 1002 of the shared canvas on the remote user's device 1004 from the perspective of the remote user 1006.

Figure 11:
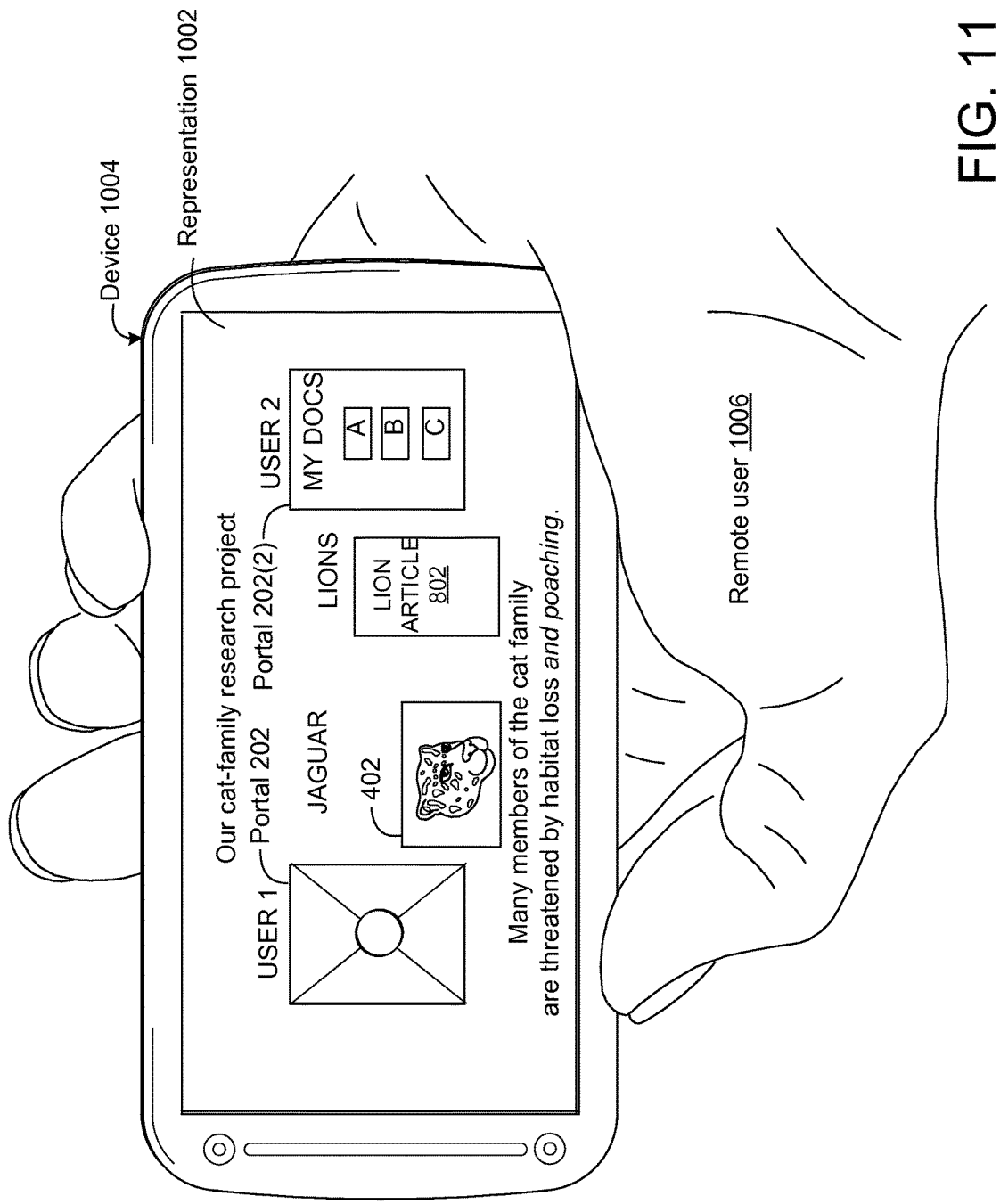

FIG. 11 shows a subsequent representation on the remote user's device 1004 where the remote user has added content to the shared canvas via the remote device. In this case, the remote user added the words "and poaching" so that the sentence now reads "Many members of the cat family are threatened by habitat loss and poaching." Various techniques can be employed to indicate which user contributed which content. In this case, the remote user's content is shown in italics whereas the first user's content is shown in standard text. Of course, other techniques can be utilized to distinguish users' contributions. For instance, different colors of text may be associated with different users.

Figure 12:
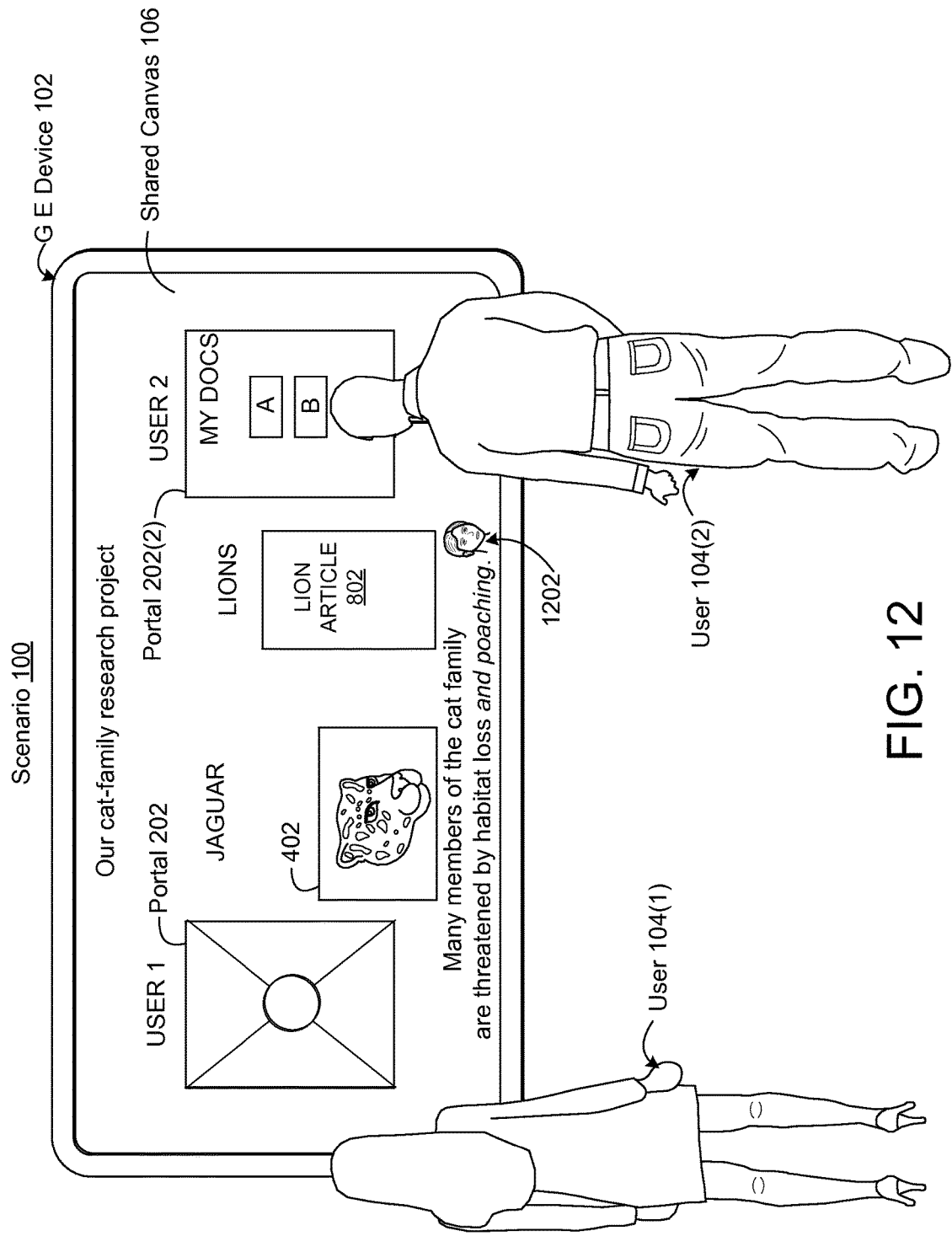

FIG. 12 shows shared canvas 106 with the addition of the content added by the remote user. Further, in this case, the remote user's photo 1202 appears on the shared canvas proximate to his content so that the other users can readily determine what the remote user added. In this case there are two indicators: first, the remote user's text is different (e.g. italicized) and the remote user's image is shown by the content. Of course, other techniques for identifying a specific user's content can be employed.

Figure 13:
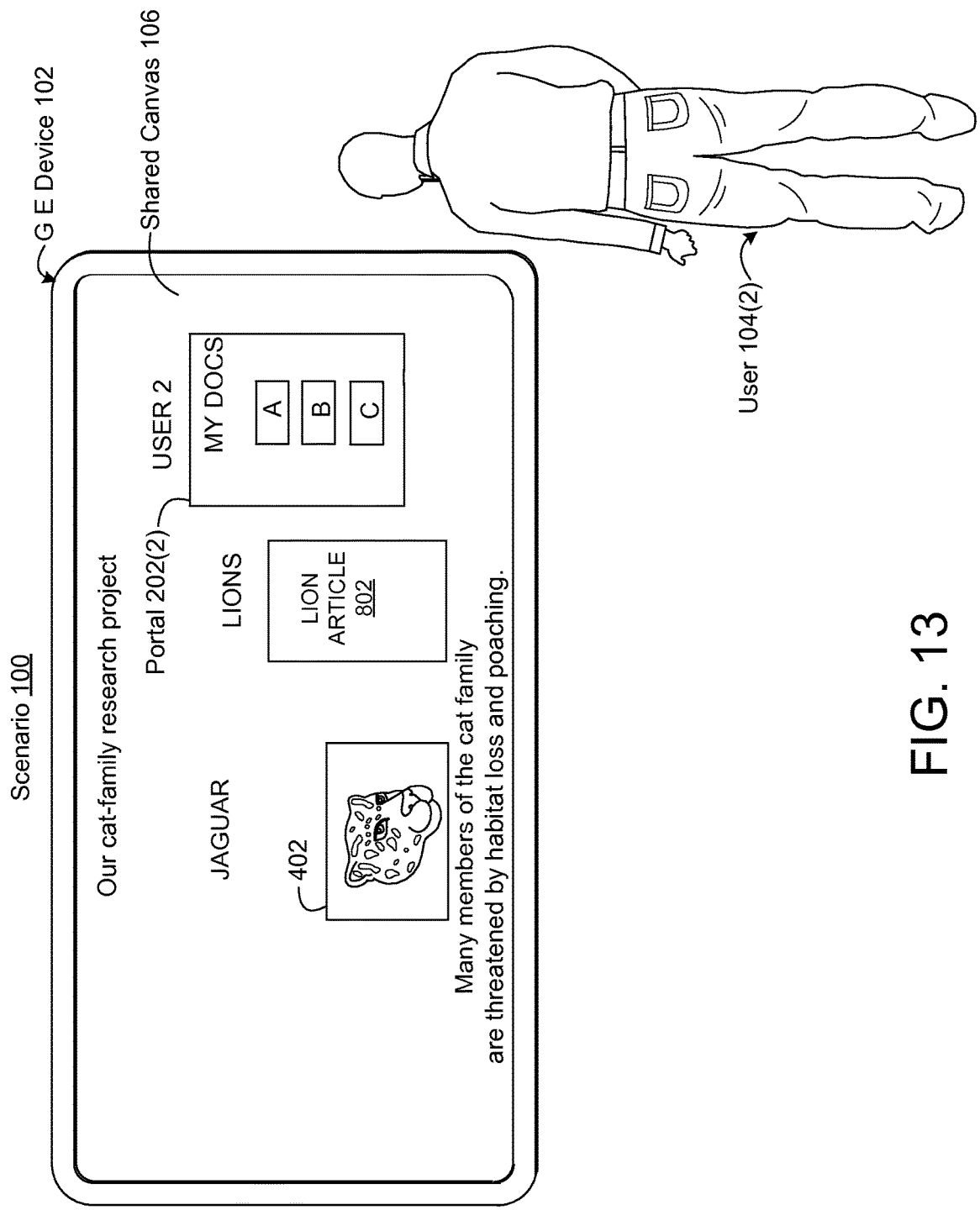

FIG. 13 shows a subsequent instance where the first user left the conference room and the remote user disconnected or disengaged from the shared session. Responsively, the first user's portal is removed from the shared canvas 106. Similarly, the remote user's photo is removed. However, there can be persistent identification of which user contributed which content to the shared canvas.

Figure 14:
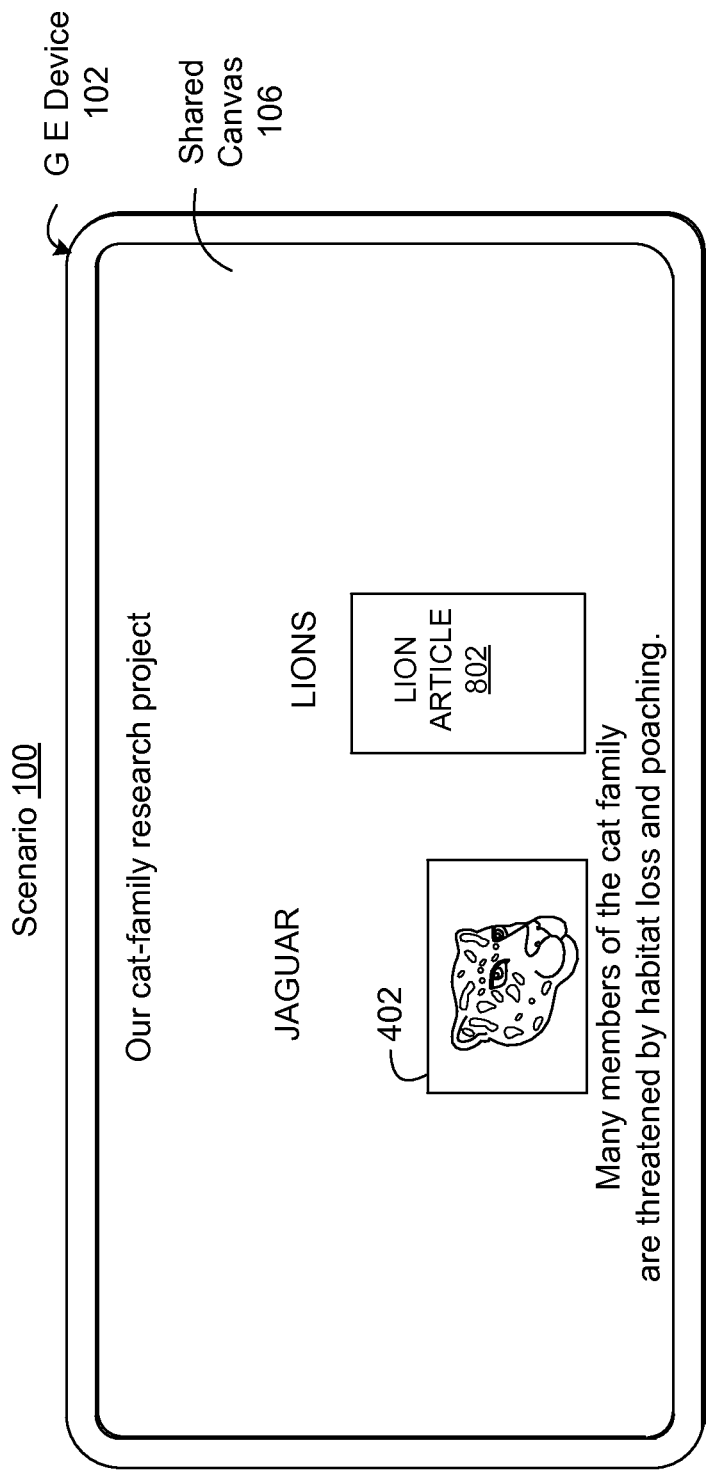

FIG. 14 shows the shared canvas 106 as the second user leaves the room and his portal is removed from the shared canvas. In some implementations, a copy of the shared canvas can be automatically stored for the users so that the next time they enter the room the shared canvas is returned in its previous state. In summary, FIGS. 1-14 show how the shared canvas can allow multiple users to collaborate on a project (or other content). The collaboration can be serial and/or simultaneous.

Figure 15:
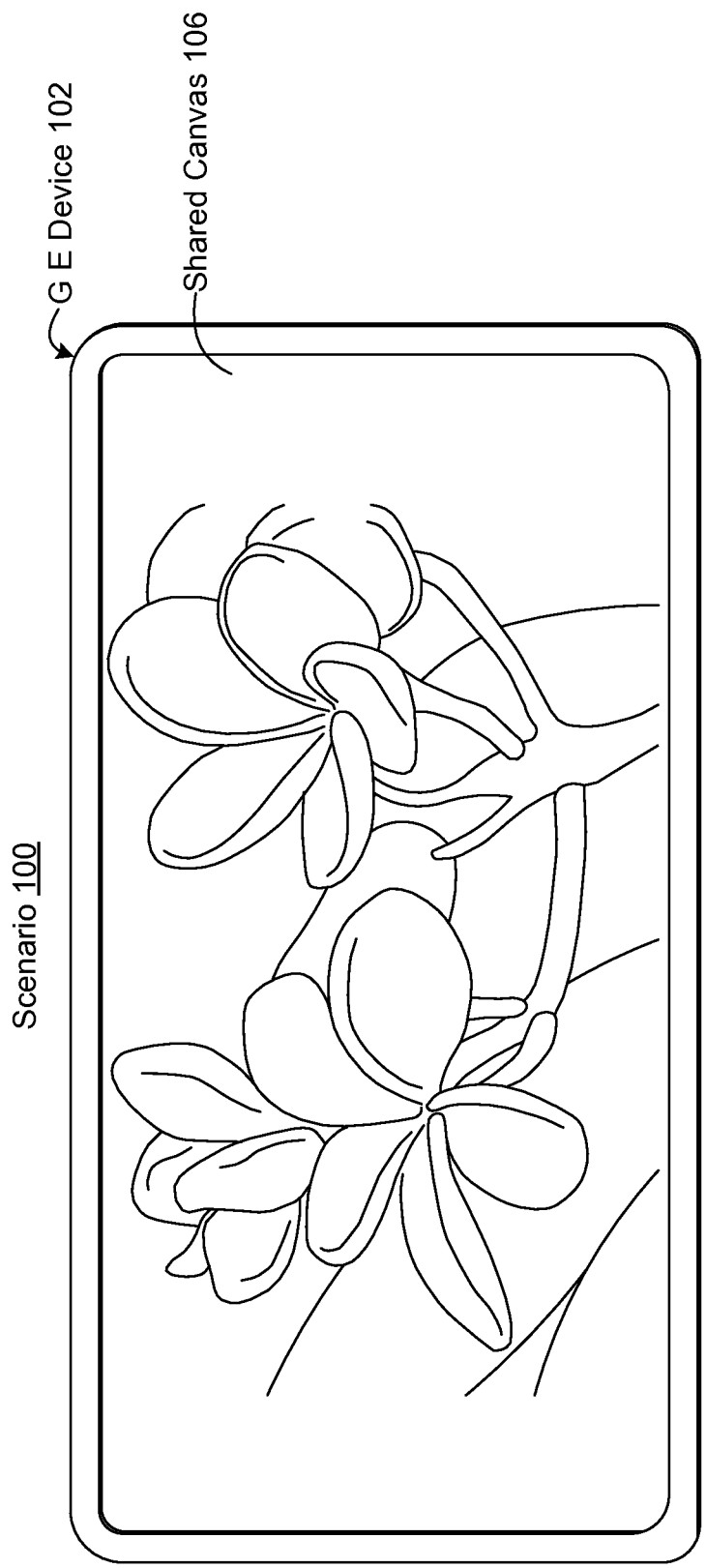

FIG. 15 shows a subsequent view where the content of the shared canvas 106 has been deleted and the group experience device 102 can await more users. In some implementations, the group experience device can positively contribute to the aesthetics of its environment when not in use. In this case, art is displayed on the group experience device when not used. In other cases, advertisements can be presented on the group experience device when not in use. Still other implementations can power down the display when not in use to save power though sensors can remain active to detect the presence of new users. Of course, the context of use can affect what actions are taken when the users are not actively using the shared canvas. An alternative example is shown and described below relative to FIG. 16.

Figure 16:
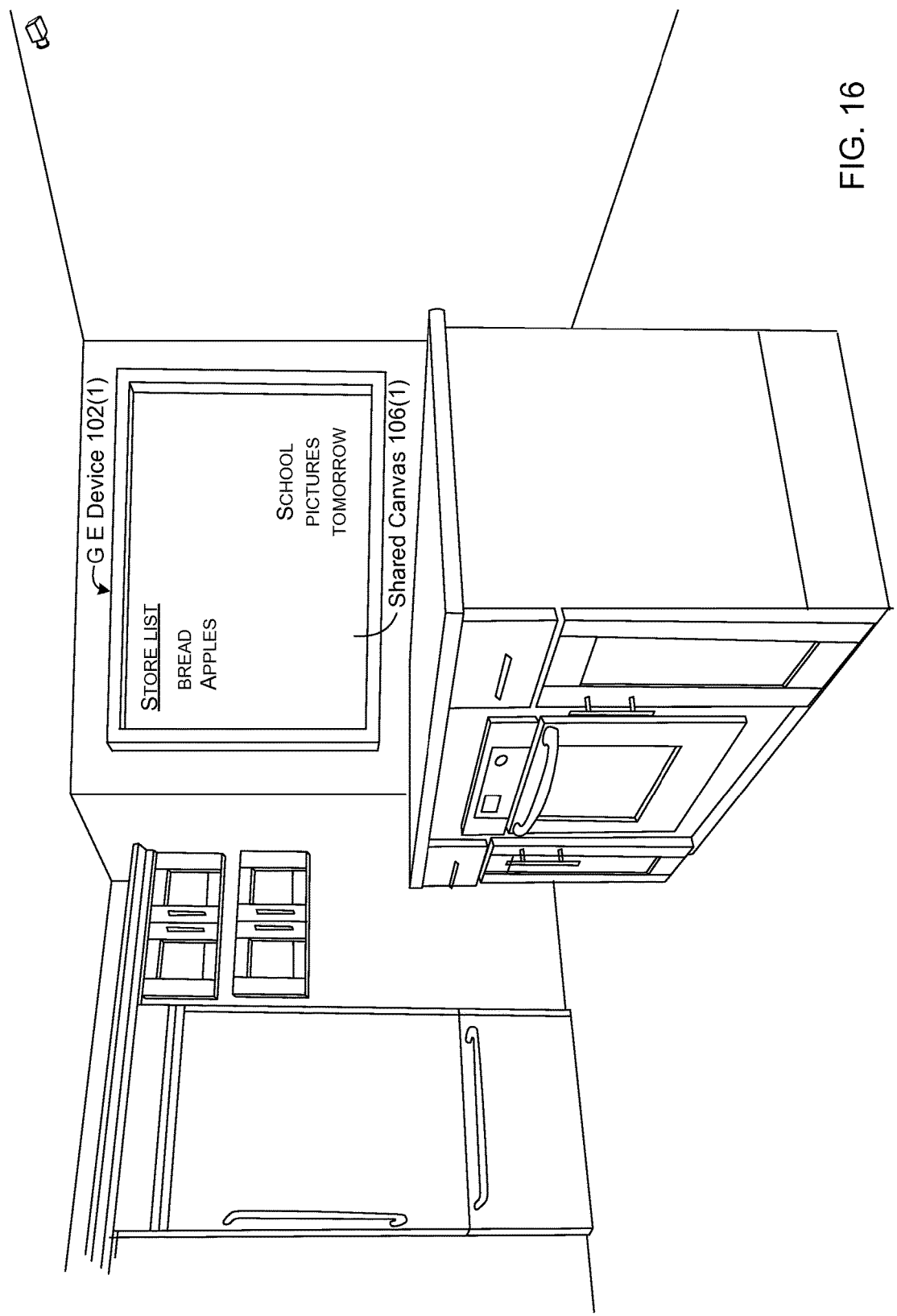

FIG. 16 shows a shared canvas 106(1) on a group experience device 102(1) in a home environment. In this case, the members of the family can be the users. In this context the family may want the shared canvas 106(1) to persist indefinitely until they decide to delete it or to temporarily or permanently display something else. For example, the shared canvas 106(1) can be persistent, but the family may intermittently use the group experience device 102(1) to watch video content (such as TV) and then switch back to the shared canvas 106(1). In a family-centric use case, sometimes the family members may engage the shared canvas at the same time. At other times, one family member may add or delete something to the shared canvas or simply view the shared canvas. Regardless, the shared canvas can be visible to, and/or engaged by, the family members as they pass by.

To summarize, some implementations can include a large screen that blossoms from its ambient, low-power state into a clean shared canvas, ready to turn on, as soon as a person's local existence is detected by the group experience device. This shared canvas can be thought of as the GUI shell of a group experience operating system. The GUI shell can function as a content container as well as an application container. It can act as both a surface for new content creation as well as a surface for "tunnels" or "portals" to expose other devices' desktops and applications. It can also be where users interact with applications running locally on the large screen group experience device.

Examples of portals or tunnels can include interactive projection of an application and/or a desktop of a personal companion device in the room. Another example can include an interactive projection of an application and/or a desktop of a remote, personal companion device. Still other examples can include an application running on a local device and/or applications running in the cloud.

Any detected user can use the shared canvas. Attempts can be made to authenticate the detected user (e.g., identify the user with a degree of confidence). In some implementations, authenticated users are indicated by name and picture on the shared canvas. Their associated devices can be grouped under their picture if they open a portal. These authenticated devices can be "tunneled" onto a sub-window on the shared canvas at any time. The sub-window (e.g., portal or tunnel) can be the user's personal space on the shared canvas. While specific portal examples are illustrated and discussed above, the inventive concepts are not intended to be limited to these examples. Instead, a portal can simply be a way for a user to access private content on the shared canvas paradigm.

Figure 17:
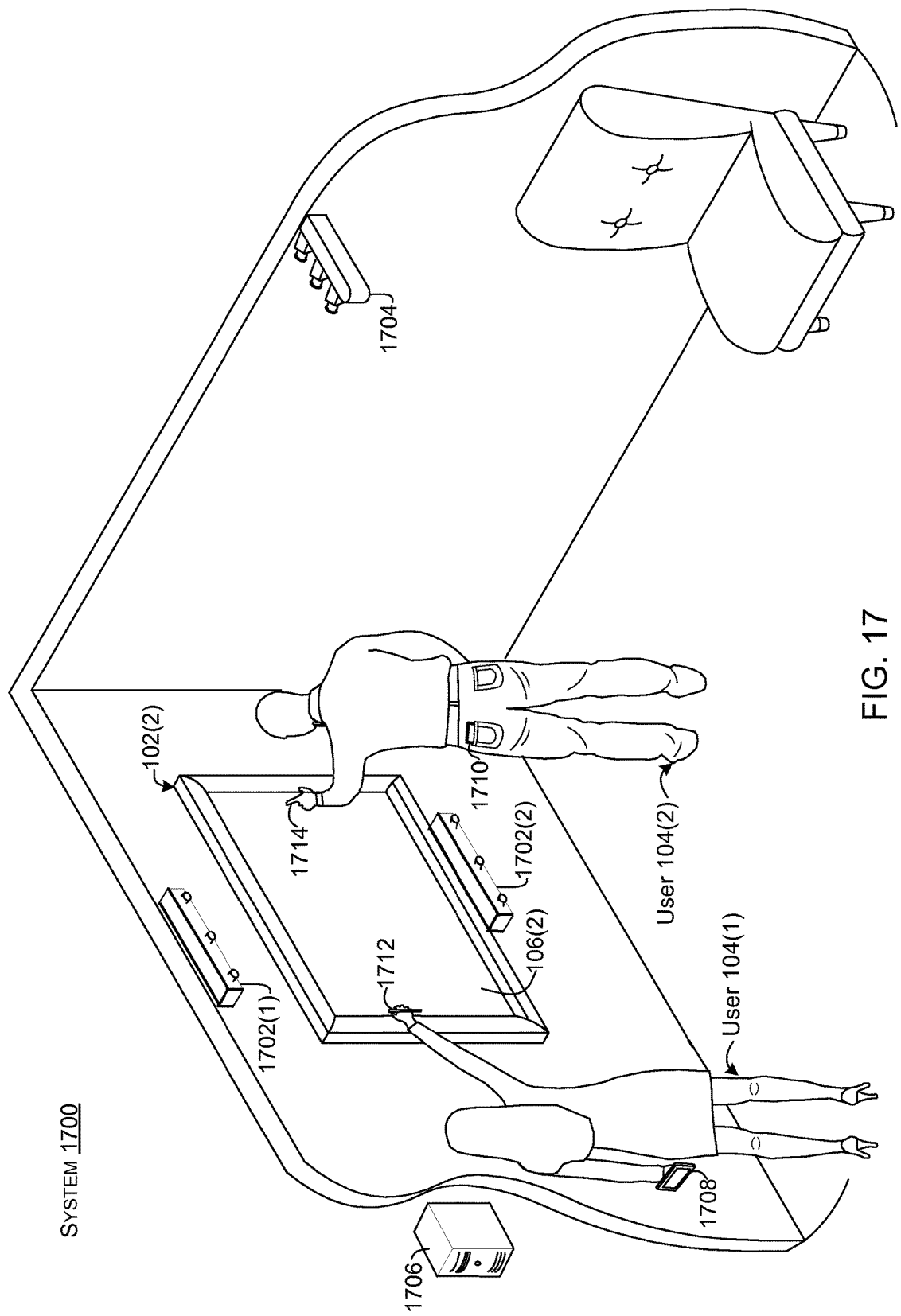
FIGS. 17-18 show example shared digital workspace systems in accordance with some implementations of the present concepts.
Figure 18:
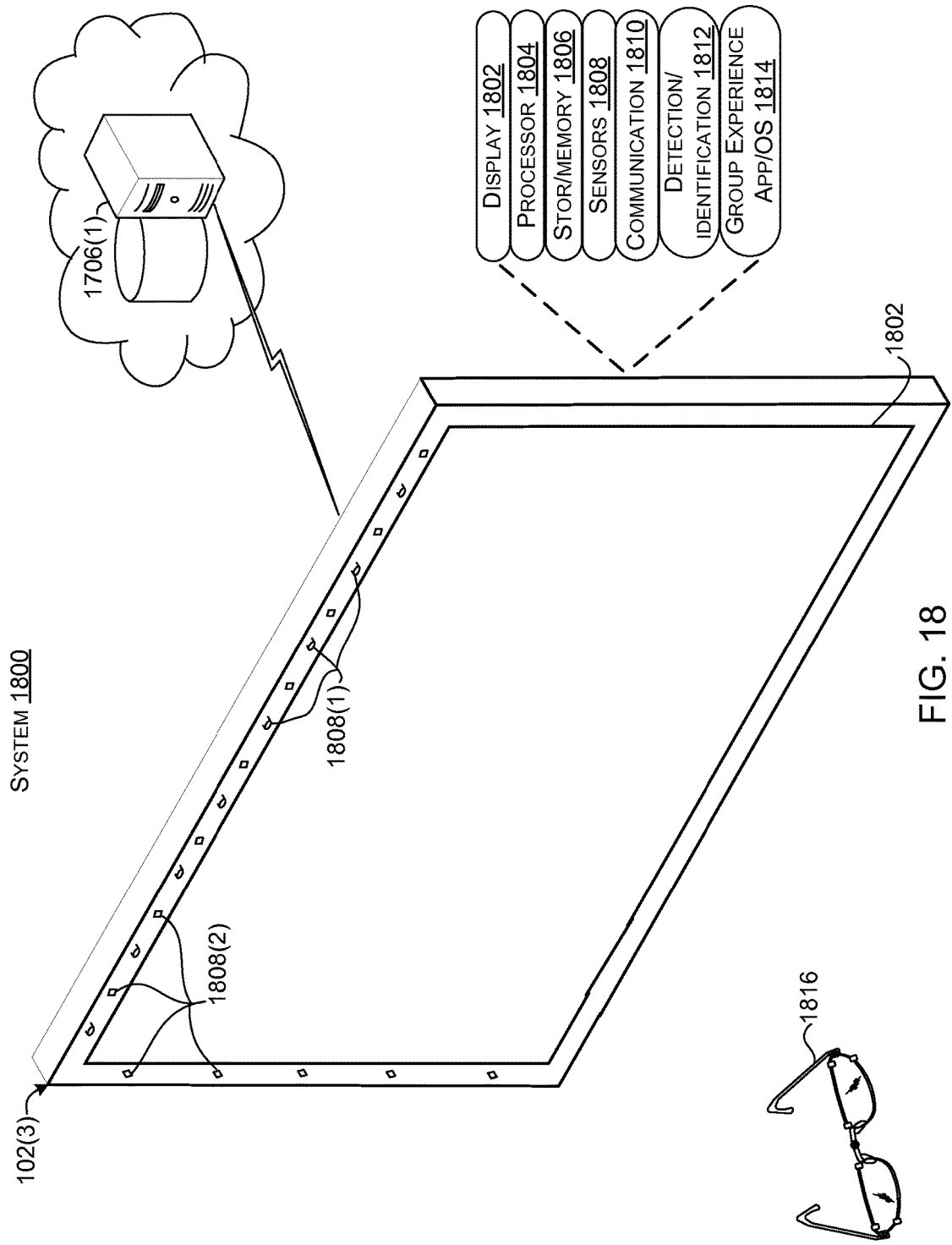

FIGS. 17-18 relate to systems for accomplishing group experience concepts. These systems can include a display and sensors for detecting and identifying users and for identifying user commands (e.g., control gestures). Specific system examples are introduced followed by a discussion of other system display and sensor configurations.

FIG. 17 shows an example group experience system 1700. In this case, the system includes a group experience device 102(2) manifest as a touch screen or touch display and two sets of sensors 1702 and 1704. The shared canvas 106(2) can be presented on the touch display. In this case, the first set of sensors 1702 can be oriented to sense an area in front of the shared canvas 106(2). This orientation is intended to detect users as they enter the room. The second set of sensors 1704 can be oriented to sense an area directly in front of the shared canvas 106(2). This orientation is intended to detect user's engaging the shared canvas 106(2) with user commands. In this case, the display and the two sets of sensors are connected to a computing device 1706 (in this case not visible to the users) which performs processing for a group experience graphical user interface of the shared canvas which is presented on the group experience device 102(2).

The first set of sensors 1702 can detect that a user or users have entered the room in which the group experience device 102(2) is positioned (or have otherwise entered an area of interest). In this case, the first set of sensors includes two outwardly facing subsets 1702(1) and 1702(2) positioned above and below the group experience device 102(2) to detect user gestures, touch and/or eye gaze direction. Note that the number, position, and/or orientation of the first and second sets of sensors 1702 and 1704 is provided for purposes of example and is not intended to be limiting. It is contemplated that many other sensor arrangements can be configured to accomplish the present concepts. Further, while distinct and conspicuous sensors are illustrated, it is contemplated that the sensors will become smaller and less evident to the user as the technology matures.

The first and second sets of sensors 1702 and 1704 can be cameras, such as arrays of cameras. The cameras can be configured for visible light, infrared, and/or other frequencies. The cameras may operate in cooperation with an infrared pattern projector that can aid the cameras to distinguish objects from one another. Other camera configurations may employ time of flight or other techniques to enhance information captured by the cameras about the users and/or the environment around the group experience device 102(2). In one implementation, the first and second sets of sensors can be Kinect™ brand sensing technology offered by Microsoft® Corp.

Once users have been detected, the first and/or second sets of sensors 1702 and 1704 can employ biometrics, such as face tracking and face recognition/identification to attempt to identify the users. For instance, tracked biometric features can be compared to a database of known users for a potential match. Simultaneously, the users' position relative to the shared canvas 106(2) and movements can be tracked to determine if the user is attempting a user command, such as writing on the display, making a control gesture, etc. At this point, the basic functionality is available to the user. If the user(s) are identified then secondary functionality can be made available to individual users.

In some implementations, user identification can be associated with a confidence score or level (e.g., the detected user is 'user 1' with a confidence of 70%). As such, individual features of the secondary functionality can specify a specific confidence threshold. For instance, a specific application program interface (API) may have a confidence threshold of 40% while another API may have a confidence threshold of 80%. For example, one API may be configured so that the threshold is 50% for a user on the shared canvas 106(2) to access personal photos or documents through a portal, while another API may require a 90% threshold for the user to access financial information (e.g., transfer funds or access credit card numbers) through the portal.

Further still, rather than a one-time process, in the group experience system 1700, user identification may be an ongoing process where the system continuously monitors for user commands and attempts to identify which user is performing the user command. Thus, the ongoing acts of using the group experience device 102(2) can be what it authenticated (e.g., a user command was detected and in analyzing the detection, it is determined what user performed the user command). Thus, from one perspective, some implementations can monitor for user commands. The implementations can attempt to identify the user through the user command, such as from biometrics detected in the act of detecting the command. Thus, these implementations can continually detect user commands and attempt to continually identify users via the commands.

Note also, that each of the users in FIG. 17 has a personal device 1708 and 1710, respectively (in this case a smart phone). The personal device can be utilized in user detection and identification. The personal device 1708 and 1710 can work alternatively or additionally to the first and second sets of sensors 1702 and 1704 to help identify the users and/or detect user commands. For example, the personal device could send out an identification signal, like a beacon signal that can be used by the system to identify the user.

The personal device 1708 and 1710 may be leveraged in other ways. For instance, the personal device may send a capacitive signal through the user's body that can be detected when the user touches or is proximate to the group experience device 102(2). This feature can be leveraged as multipath capacitive touch. For instance different fingers have different length paths. Some implementations could also add a conductive strip on the floor below the group experience device 102(2), so that user engagement of the group experience device 102(2) completes a circuit through the group experience device and the conductive strip. Capacitance pens can be utilized in a similar manner, especially in instances where users have their own personal pens that are uniquely identifiable. Thus, pen 1712 can serve dual purposes as a digital writing instrument and to identify user 104(1).

In a similar manner, when a touch user command is detected as designated at 1714, fingerprint (and/or other biometric) analysis can be used to identify the user performing the command. Fingerprint analysis can also identify which individual finger of the user is touching the display screen and the orientation of the finger. This information can be utilized in various ways. For instance, if two users simultaneously touch a region of the board, the finger orientation (determined through the fingerprint analysis) can indicate which finger belongs to which user. For instance, fingerprints tend to be elongate along a length of the user's finger. Thus, the fingerprint can indicate the orientation of the user's finger and arm.

FIG. 18 shows an alternative group experience system configuration. This group experience system 1800 includes a group experience device 102(3) coupled to another computing device 1706(1). The other computing device can be embodied as other computers associated with individual users and/or computers that provide other functionality (e.g., search engines, user profile storage, etc.). The group experience device 102(3) can include a display 1802, a processor 1804, storage/memory 1806, sensors 1808, a communication component (hardware and/or software) 1810, a detection/identification component 1812, and a group experience application/operating system 1814. The group experience device 102(3) can alternatively or additionally include other elements, such as, buses, graphics cards (e.g., graphics processing units (CPUs), network hardware), etc., which are not illustrated or discussed here for sake of brevity.

Note further, that the present implementations are not limited to a specific type of display 1802. In contrast, workable implementations can be accomplished with projection displays, light emitting diode (LED) displays, liquid crystal displays, electroluminescent displays, plasma displays, and/or other developing or yet to be developed display types.

In this case, the display 1802 includes two sets of sensors 1808 in the form of cameras. A first set of cameras 1808(1) point away from the display 1802 and a second set of cameras 1808(2) point parallel to the display surface to sense user control gestures. The second set of cameras can allow the display to function as a touch display without actually having a touch sensitive surface (e.g., that senses a user's physical touch). In some implementations, the first set of cameras 1808(1) can include two sub-groups. The first subgroup can be configured to capture a "near field" space directly in front of the group experience device 102(3). The second subgroup can be configured to capture a "far field" space that is more distant from the group experience device. The far field subgroup can be used to detect users entering a room in which the group experience device is located. The near field subgroup can be configured to capture biometric data from the users as they engage the shared canvas. The two sets of cameras can be operated cooperatively by the detection/identification component 1812 to determine who the users are, and which user is performing a user command by touching which portion of the display 1802 (or via other user command(s)).

The group experience application/operating system 1814 can generate the shared canvas on the group experience device 102(3). The group experience application/operating system 1814 can allow user interaction of the shared canvas based upon information obtained from the detection/identification component 1812.

In some implementations, the shared canvas can be thought of as being autonomous from the users. The users can be thought of as guests on the shared canvas and the users have equal standing relative to the shared canvas. Thus, in at least some implementations there is no controlling or primary user. In other implementations, the shared canvas can be associated with an individual user (e.g., primary user), such as a user that launches the shared canvas. In this latter configuration, the other users can be secondary to the primary user relative to that instance of the shared canvas.

While the illustrated second set of cameras sense along a surface of the display 1802, other camera configurations can be employed such as those that image through the display. One suitable camera for such a configuration is a wedge type camera that could be positioned in front of or behind the display or to the side of the display. This type of configuration can detect the user's fingers touching the display and can also look at the user's eyes to determine where on the display the user is looking. Biometric information obtained by the cameras can be utilized by the detection/identification component 1812 to identify the user touching the display. Alternatively or additionally, this information can be interpreted as a user command. For instance, where the user is looking at on the shared canvas (e.g., user gaze) can be interpreted as a user command relative to content at that location, for example.

While not illustrated, in a corporate setting the system could also utilize the user's badge for user identification purposes. For instance, the system could read the name on the badge, correlate the picture on the badge with the user, and/or scan the badge to obtain information, such as contained on an RFID or other device in the badge.

An alternative configuration can utilize a personal device in the form of eye tracking eyeglasses 1816. The eye tracking eyeglasses can have sensors configured to track the user's eyes and other sensors configured to detect the environment in a direction that the user is looking. The eye tracking eyeglasses can send signals to the group experience device 102(3), such as via Bluetooth technology, among others, identifying the user and where on the display 1802 the user is looking.

In summary, user authentication can be achieved through various mechanisms. The detection/identification component 1812 can analyze the available information to detect users and identify those users at a confidence level. In some cases, the user can be auto discovered and authenticated through a personal device, such as a smart phone. For instance, auto discovery can be accomplished via device discovery. The user who is logged into a recognized mobile device and is proximate to the group experience device 102(3) can appear as a user in the group experience system 1800. For instance, the personal device may provide an ultrasound signature, network infrastructure, Wi-Fi Direct, optical signatures, manual connection, etc. In other cases, the user can be automatically identified through face recognition, such as using Kinect (e.g., cameras 1808(1)).

In some cases, users may be manually authenticated into the system, such as via a keyboard, fingerprint scanner, badge, NFC, etc.

A remote user can manually authenticate into the group experience system by having the URL identifier of the open group experience. An indication regarding the remote user may be presented on the group experience device 102(3). A user that is present may allow or disallow the remote user.

Once the detection/identification module 1812 identifies the user with a given certainty/confidence additional functionality can be made available. In some cases, APIs can be set up so that only those API calls from a user that is authenticated with a certainty above a threshold for that API go through.

The detection/identification component 1812 may continuously or repeatedly attempt to identify the users. In one configuration, the detection/identification component can continuously attempt to detect user commands and identify who is performing the user commands. Thus, every action taken by the user can be part of the authentication process. This can provide frictionless instant authentication based upon each action/interaction rather than per session. This configuration can also allow multiple modes at the same time because it can know what user is asking for each one. Viewed from one perspective, in some implementations, the user can become the glue to all actions. In essence, the user can frictionlessly engage the group experience device 102(3). Individual actions (e.g., user commands) performed by the user are evaluated and identified to the user. Thus, in some implementations, it is the user actions that can be authenticated rather than the user.

From one perspective, group experience device 102(3) can be thought of as a computer. Processor 1804 can execute data in the form of computer-readable instructions to provide a functionality. Data, such as computer-readable instructions and/or user-related data, can be stored on storage 1806, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, group experience device 102(3) can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

Examples of other computers can include traditional computing devices, such as personal computers, desktop computers, notebook computers, cell phones, smart phones, personal digital assistants, pad type computers, cameras, large display devices, projection devices, or any of a myriad of ever-evolving or yet to be developed types of computing devices.

The user's privacy can be protected by only enabling user discovery/identification features upon the user giving their express consent. All privacy and security procedures can be implemented to safeguard the user. For instance, the user may provide an authorization (and/or define the conditions of the authorization) on his/her smartphone. The smartphone can be detected by other computing devices (e.g., the group experience device). Those devices only proceed with the identifying the user according to the conditions of the authorization. Otherwise, user information is not gathered. Instead the user can be offered the basic functionality as a 'generic user'. Advanced functionality may not be enabled for the user in such a scenario.

METHOD EXAMPLE

Figure 19:
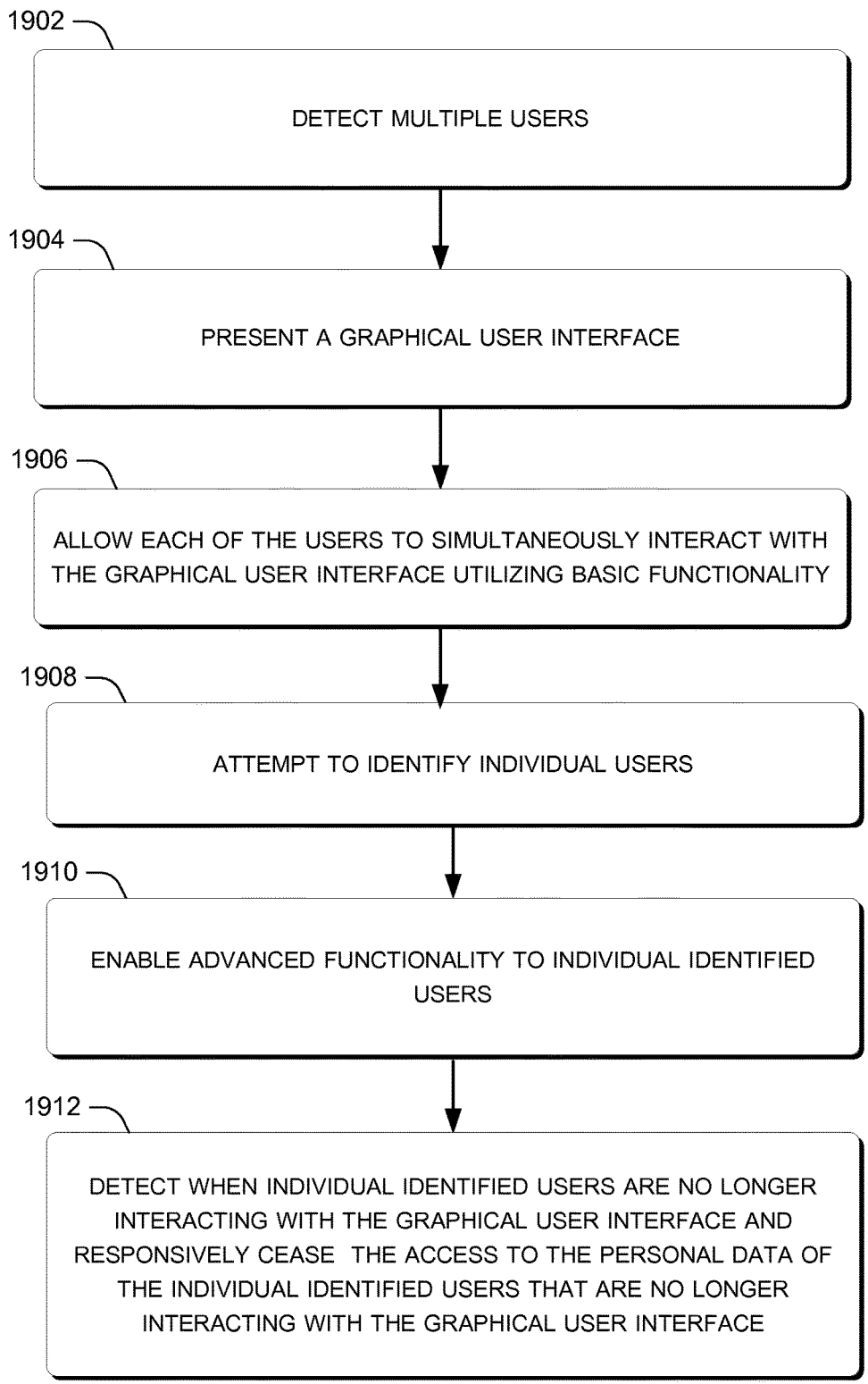
FIG. 19 is a flowchart of example shared digital workspace techniques in accordance with some implementations of the present concepts.

FIG. 19 shows an example group experience method 1900.

In this case, the method can detect multiple users at block 1902.

The method can present a graphical user interface (GUI) at block 1904.

The method can allow each of the users to simultaneously interact with the GUI utilizing basic functionality at block 1906.

From one perspective this multiuser GUI can be thought of as a 'shared canvas' where users create new content. In some implementations, touch, via finger touch (e.g., touch) and/or pen touch (e.g., pen) can be the primary input mechanisms for creation of new content on the shared canvas via basic functionality. Much like a physical whiteboard, a user can write free-form ink on the canvas. In some cases, the canvas can be scrollable, to create an (essentially) infinite canvas. This ink can be automatically recognized through a number of shape recognizers, bridging the gap between free form ink and objects with schema and behaviors. For example, as a user writes a list, the methods can recognize this and start to draw guide lines for the next item in the list as well as provide behaviors for ink-to-text, sorting, etc.

The method can attempt to identify individual users at block 1908. User identification can utilize biometrics and/or personal devices, among others, to identify the user. Specific examples are described in more detail above relative to FIGS. 17-18.

The method can enable advanced functionality to individual identified users at block 1910. For example, the advanced functionality can include access to personal data of the individual identified users on the graphical user interface.

The advanced functionality can relate to personal data, such as may be accessed via tunnels or portals. Content objects can be instantiated from tunnels. For example, the user can take a snapshot of the current projection of a mobile device and it can appear as a native image object on the shared canvas. That image object can contain the metadata (user, machine, date/time, file, application, position) to fully understand the provenance of the image.

Going in the other direction, content objects can be dragged from the shared space into tunnels (e.g., personal space). This can be enabled as a simple cut and paste operation into the active application of the tunnel (a copy operation), or as embedding of a hyperlink to the content object in that canvas (a reference operation).

When a user instantiates a new tunnel that includes either a local or cloud application, the method can know who instantiated it, so it can appear where that tunnel has a clear visual notification that it is running under the identity of the user who created the tunnel.

The method can use various techniques to determine which user instantiated a tunnel. If the tunnel is a projection of a remote or local mobile device, then the tying of authentication can be done automatically by passing through the authenticated user on the mobile device as the "owner" of the tunnel. If the instantiation of the tunnel is done at the screen on the shared canvas, then the technique can use a combination of mechanisms to determine the identity of the corresponding user. For example, user tracking mechanisms, such as Kinect, can use optical and depth sensing cameras. The technique can determine who is touching the screen and where. Facial recognition can identify the user, and through touch identification in the screen touch sensor or sensing positioning of users correlated with touch points identified by the touch sensor, the technique can determine who is touching the screen and exactly where and with how many fingers.

The user identity can be tied to the tunnel. Similarly, the present techniques can tie the identity of the tunnel creator to any new content object created on the shared canvas from the tunnel. For instance, as someone is drawing free form ink on the shared canvas, the same facial recognition and touch identification mechanisms can be used to tie the metadata of who created the object to that object. This can enable scenarios like searching for the content by a specific user or by a specific user in a specific location.

Some implementations can offer a separate affordance on the shared canvas in the form of a search box. This search box can be instantiated either through a touch affordance or by simply drawing a question mark on the shared canvas with ink. Users can use ink, voice, or keyboard entry, among others, to enter their query into this search box. The search box can be used to instantiate content objects (e.g., by asking a question that is understood on the device or on backend devices, such as through natural language processing (NLP) or other techniques). This technique can instantiate a live dynamic chart to search the web (bringing up a tunnel with a browser showing the web search results), or to search for other shared canvas content that the user has access to (e.g., a shared canvas they worked on last week).

In some configurations, each shared canvas can be fundamentally addressed through a uniform resource locator (URL). Shared canvases can be maintained in a cloud service for retrieval, search, analytics, etc. Metadata for a shared canvas can include the device name on which a group experience was instantiated as well as the names that were subsequently opened and edited during the group experience session. This can allow users to search the shared canvas corpus by device, user, content, and/or date/time, among others.

In some implementations, to easily retrieve previous shared canvases, the canvas can have a mechanism to open a gallery that can show previous canvases for this device (created on this device) and the set of currently recognized users (created on any device, but the current set of users have access). Some configurations can automatically determine that a previous group of users has returned and present a "welcome back experience" where the system proactively recognizes (through voice and vision) returning user(s) and automatically sets the device state to the last session.

The method can detect when individual identified users are no longer interacting with the graphical user interface. Responsively, the method can cease access to the personal data of the individual identified users who are no longer interacting with the graphical user interface at block 1912.

The described methods can be performed by the systems and/or devices described above relative to FIGS. 17-18, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

To summarize, the present techniques can offer a low friction or frictionless ability to engage in a group experience on a shared device GUI. Any set of users can approach and simultaneously interact with the device using intuitive and/or widely recognized user commands.

CONCLUSION

In summary, the shared canvas can allow multiple users to interact simultaneously. The shared canvas can attempt to recognize users to offer additional functionality, such as personalized functionality and/or access to private content. Recognized users can bring their private content into the shared space through a tunnel or other mechanism.

The present concepts can be distinguished from existing sharing where each user has their own device to get to shared space, such as during a conference call. Instead, in some implementations of the present concepts, the shared canvas does not belong to any of the users. The group experience device supporting the shared canvas can know about the users that are simultaneously using it either actively and/or viewing as part of the group. The shared canvas can offer a mechanism for individual people to get to their private assets and interact with those on the shared canvas.

Although techniques, methods, devices, systems, etc., pertaining to group experience display devices are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a display device;
sensors configured to detect users proximate the display device;
a processing device; and
a storage device storing computer-executable instructions which, when executed by the processing device, cause the processing device to:
present a group experience graphical user interface on the display device, wherein the detected users engage the group experience graphical user interface in a collaborative manner;
recognize gestures performed by the detected users from gesture data collected by the sensors;
provide basic functionality to the detected users in response to the recognized gestures;
perform authentication of the detected users to identify authenticated users, the authentication being performed using signals received from personal devices of the detected users; and
based at least in part on the authentication, provide advanced functionality to the authenticated users, wherein the advanced functionality includes retrieving personal data from at least two different personal devices of at least two different authenticated users responsive to additional gestures and presenting the personal data retrieved from the at least two different personal devices on the display device.

2. The system of claim 1, wherein the computer-executable instructions, when executed by the processing device, cause the processing device to:
modify the group experience graphical user interface to visually distinguish contributions of the at least two different authenticated users.

3. The system of claim 1, wherein the basic functionality comprises writing on the group experience graphical user interface and wherein the computer-executable instructions, when executed by the processing device, cause the processing device to:
modify the group experience graphical user interface to distinguish writing performed by a first user from writing performed by a second user.

4. The system of claim 1, wherein the computer-executable instructions, when executed by the processing device, cause the processing device to:
automatically save a copy of the group experience graphical user interface when the users are no longer detected by the sensors.

5. The system of claim 4, wherein the computer-executable instructions, when executed by the processing device, cause the processing device to:
automatically present the saved copy of the group experience graphical user interface to the same users when the same users are subsequently detected by the sensors and authenticated.

6. The system of claim 4, wherein the computer-executable instructions, when executed by the processing device, cause the processing device to:
recognize a remote user that can view and interact with the group experience graphical user interface via a remote personal device.

7. A method comprising:
presenting a group experience graphical user interface on a display device, wherein detected users engage the group experience graphical user interface in a collaborative manner;

recognizing gestures performed by the detected users from gesture data collected by one or more sensors;

providing, via the group experience graphical user interface, basic functionality to the detected users in response to the recognized gestures;

performing authentication of the detected users to identify authenticated users; and based at least in part on the authentication, providing advanced functionality to the authenticated users, wherein the advanced functionality includes retrieving personal data from at least two different personal devices of at least two different authenticated users responsive to additional gestures and presenting the personal data retrieved from the at least two different personal devices on the display device in the group experience graphical user interface.

8. The method of claim 7, the detected users including a remote user, the method further comprising:

receiving content from a remote personal device of the remote user; and presenting the content on the group experience graphical user interface together with the personal data.

9. The method of claim 7, wherein the performing authentication includes receiving signals from the at least two different personal devices.

10. The method of claim 7, wherein the performing authentication includes analyzing biometric data of the detected users.

11. The method of claim 10, wherein the analyzing biometric data of the detected users includes:

comparing biometric features in the biometric data to a database of known users;

assigning respective confidence levels to individual detected users; and designating certain detected users as the authenticated users based at least on the respective confidence levels.

12. The method of claim 7, the providing basic functionality comprising:

receiving writing inputs from individual detected users; and modifying the group experience graphical user interface to show writing based at least on the received writing inputs.

13. The method of claim 7, the providing basic functionality comprising:

receiving text inputs from individual detected users; and modifying the group experience graphical user interface to show text based at least on the received text inputs.

14. A system, comprising:

a processing device; and a storage device storing computer-executable instructions which, when executed by the processing device, cause the processing device to:

present a group experience graphical user interface for display, wherein detected users engage the group experience graphical user interface in a collaborative manner;

recognize gestures performed by the detected users from gesture data collected by one or more sensors;

provide, via the group experience graphical user interface, basic functionality to the detected users in response to the recognized gestures;

perform authentication of the detected users to identify authenticated users; and based at least in part on the authentication, provide advanced functionality to the authenticated users, wherein the advanced functionality includes retrieving personal data from at least two different personal devices of at least two different authenticated users responsive to additional gestures and presenting the personal data retrieved from the at least two different personal devices for display on the group experience graphical user interface.

15. The system of claim 14, wherein the computer-executable instructions, when executed by the processing device, cause the processing device to:

responsive to detection of the detected users, cause a display device to enter a ready state and present the group experience graphical user interface on the display device.

16. The system of claim 14, wherein the computer-executable instructions, when executed by the processing device, cause the processing device to:

responsive to the gestures performed by the detected users, modify the group experience graphical user interface with text or writing identified via the gestures.

17. The system of claim 14, further comprising a camera configured to detect the gestures.

18. The system of claim 14, further comprising a camera configured to obtain biometric data of an individual detected user, wherein the authentication involves analysis of the biometric data to determine whether to designate the individual detected user as an individual authenticated user.

19. The system of claim 14, wherein the computer-executable instructions, when executed by the processing device, cause the processing device to:

present the personal data on the group experience graphical user interface in respective personal spaces for the at least two different authenticated users.

20. The system of claim 14, further comprising the at least two different personal devices and the one or more sensors.

* * * * *